US012414181B2

(12) United States Patent
Sugawara

(10) Patent No.: US 12,414,181 B2
(45) Date of Patent: Sep. 9, 2025

(54) UE AND SMF

(71) Applicant: SHARP KABUSHIKI KAISHA, Sakai (JP)

(72) Inventor: Yasuo Sugawara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 484 days.

(21) Appl. No.: 17/619,894

(22) PCT Filed: Jun. 16, 2020

(86) PCT No.: PCT/JP2020/023579
§ 371 (c)(1),
(2) Date: Dec. 16, 2021

(87) PCT Pub. No.: WO2020/255954
PCT Pub. Date: Dec. 24, 2020

(65) Prior Publication Data
US 2022/0361272 A1 Nov. 10, 2022

(30) Foreign Application Priority Data

Jun. 17, 2019 (JP) .................................. 2019-111959

(51) Int. Cl.
H04W 76/16 (2018.01)
H04W 60/04 (2009.01)
H04W 88/06 (2009.01)
(52) U.S. Cl.
CPC ........... *H04W 76/16* (2018.02); *H04W 60/04* (2013.01); *H04W 88/06* (2013.01)

(58) Field of Classification Search
CPC ..... H04W 76/16; H04W 60/04; H04W 88/06; H04W 76/12; H04W 48/18; H04W 60/005; H04W 72/04; H04W 76/10
See application file for complete search history.

(56) References Cited

U.S. PATENT DOCUMENTS

2019/0357294 A1* 11/2019 Ha ........................ H04W 76/15
2019/0394833 A1* 12/2019 Talebi Fard ........ H04W 68/005
(Continued)

OTHER PUBLICATIONS

"3rd Generation Partnership Project; Technical Specification Group Core Network and Terminals; Non-Access-Stratum (NAS) protocol for 5G System (5GS); Stage 3(Release 16)", 3GPP TS 24.501 V16.1.0(Jun. 2019), Jun. 14, 2019, pp. 305-312.
(Continued)

Primary Examiner — Luat Phung
(74) Attorney, Agent, or Firm — ScienBiziP, P.C.

(57) ABSTRACT

According to one aspect of the present invention, a communication unit for realizing a function for ATSSS in a 5GS is provided. A UE transmits a PDU session establishment request message including an MA PDU Request indication and ATSSS Capability, and in a case that an MA PDU session is allowed to be established and that only the user plane resources for one of 3GPP access or non-3GPP access are allowed to be established, the UE receives information indicating that the MA PDU session is allowed to be established, an access type corresponding to the user plane resources allowed to be established, a value indicating a cause of disallowance of establishment of the user plane resource for an access type different from the above-described access type, and a PDU session establishment accept message including ATSSS rules, and establishes the MA PDU session.

4 Claims, 5 Drawing Sheets

(56) References Cited

U.S. PATENT DOCUMENTS

| | | | |
|---|---|---|---|
| 2020/0236727 A1* | 7/2020 | Salkintzis | H04W 48/18 |
| 2021/0037585 A1* | 2/2021 | Youn | H04W 76/30 |
| 2021/0410010 A1* | 12/2021 | Salkintzis | H04W 76/15 |
| 2022/0182923 A1* | 6/2022 | Yao | H04W 24/10 |
| 2024/0015562 A1* | 1/2024 | Youn | H04W 24/10 |
| 2024/0056955 A1* | 2/2024 | Zia | H04W 48/16 |
| 2024/0259857 A1* | 8/2024 | Zhu | H04W 28/0263 |

OTHER PUBLICATIONS

"3rd Generation Partnership Project ; Technical Specification Group Core Network and Terminals; Access Traffic Steering, Switching and Splitting; Stage 3 (Release 16 )", 3GPP TS 24.193 V0.2.0 (May 2019).

"3rd Generation Partnership Project; Technical Specification Group Services and System Aspects; Study on access traffic steering, switch and splitting support in the 5G system architecture(Release 16)", 3GPP TR 23.793 V16.0.0 (Dec. 2018).

"3rd Generation Partnership Project; Technical Specification Group Services and System Aspects; Procedures for the 5G System; Stage 2(Release 16)", 3GPP TS 23.502 V16.1.1 (Jun. 2019).

"3rd Generation Partnership Project; Technical Specification Group Services and System Aspects; System Architecture for the 5G System; Stage 2(Release 16)", 3GPP TS 23.501 V16.1.0 (Jun. 2019).

* cited by examiner

UE AND SMF

TECHNICAL FIELD

This application relates to a UE and an SMF. This application claims the benefit of priority to JP 2019-111959 filed on Jun. 17, 2019, which is incorporated herein by reference in its entirety.

BACKGROUND ART

In the 3rd Generation Partnership Project (3GPP), the system architecture of a 5G System (5GS) corresponding to a fifth generation (5G) mobile communication system has been under study, and the support of new procedures and new functions has been discussed (see NPL 1 and NPL 2). For the 5G System (5GS), a 5G Core Network (5GC) corresponding to a new core network has been under study in order to provide a wide variety of services. Furthermore, discussions have also been started for the support of Access Traffic Steering, Switching and Splitting (ATSSS), which requires high reliability and/or low latency communication, in the 5GS (see NPL 1, NPL 2, and NPL 3).

CITATION LIST

Non Patent Literature

NPL 1: 3GPP TS 23.501 V16.1.0 (2019-06); 3rd Generation Partnership Project; Technical Specification Group Services and System Aspects; System Architecture for the 5G system; Stage 2 (Release 16)
NPL 2: 3GPP TS 23.502 V16.1.1 (2019-06); 3rd Generation Partnership Project; Technical Specification Group Services and System Aspects; Procedures for the 5G system; Stage 2 (Release 16)
NPL 3: 3GPP TR 23.793 V16.0.0 (2018-12); 3rd Generation Partnership Project; Technical Specification Group Services and System Aspects; Study on access traffic steering, switch and splitting support in the 5G system architecture (Release 16)

SUMMARY OF INVENTION

Technical Problem

In regard to ATSSS, discussions have been made for a communication method using, in addition to a normal Protocol Data Unit or Packet Data Unit (PDU) session (also referred to as a single access PDU session, SA PDU Session), a special PDU session referred to as a multi-access PDU session (also referred to as an MA PDU Session), but no studies have been conducted about the details of the behavior of each apparatus in a case that a PDU session establishment procedure is performed to establish the MA PDU Session. In particular, in the procedure, it has not been clarified what behavior is performed by each apparatus in response to permission or rejection of a PDU session establishment request message by a network side in a case that a UE transmits the PDU session establishment request message.

In light of the foregoing, an object of the present invention is to provide a measure for clarifying the behavior of each apparatus in a case that the PDU session establishment procedure is performed to establish an MA PDU Session.

Solution to Problem

A UE according to one embodiment of the present invention is a User Equipment (UE) including: a controller; and a transmission and/or reception unit, wherein the controller initiates a PDU session establishment procedure, and in a case that the transmission and/or reception unit receives a PDU session establishment accept message including an Access Traffic Steering, Switching, Splitting (ATSSS) container Information Element (IE) including ATSSS rules, the controller recognizes that a Multi-Access (MA) PDU session is established and that user plane resources of the MA PDU session for one access are established.

An SMF according to one embodiment of the present invention is a Session Management Function (SMF) including: a controller; and a transmission and/or reception unit, wherein the controller performs a PDU session establishment procedure, and by transmitting, by the transmission and/or reception unit, a PDU session establishment accept message including an Access Traffic Steering, Switching, Splitting (ATSSS) container Information Element (IE) including ATSSS rules, the controller indicates to a User Equipment (UE) that a Multi-Access (MA) PDU session is established and that user plane resources of the MA PDU session for one access are established.

A UE according to one embodiment of the present invention is a User Equipment (UE) including: a controller; and a transmission and/or reception unit, wherein the transmission and/or reception unit receives, from an Access and Mobility Management Function (AMF), first information indicating whether a network supports Access Traffic Steering, Switching, Splitting (ATSSS), the controller determines whether ATSSS is supported by the network, based on the first information, and the controller does not initiate a Protocol Data Unit (PDU) session establishment procedure for establishing a Multi-Access (MA) PDU session in a case that the network does not support ATSSS.

Advantageous Effects of Invention

According to one aspect of the present invention, a function for ATSSS in the 5GS can be used. Specifically, the behavior of each apparatus can be clarified that is performed in a case that a PDU session establishment procedure is performed to establish an MA PDU Session.

DESCRIPTION OF EMBODIMENTS

Hereinafter, description is given of a mobile communication system, a configuration of each apparatus, and terms, identification information, and procedures used in the embodiments, which are mostly common to the embodiments, and then embodiments for implementing the present invention will be described.

1. Overview of Mobile Communication System

Now, a mobile communication system will be described.

Figure 1:
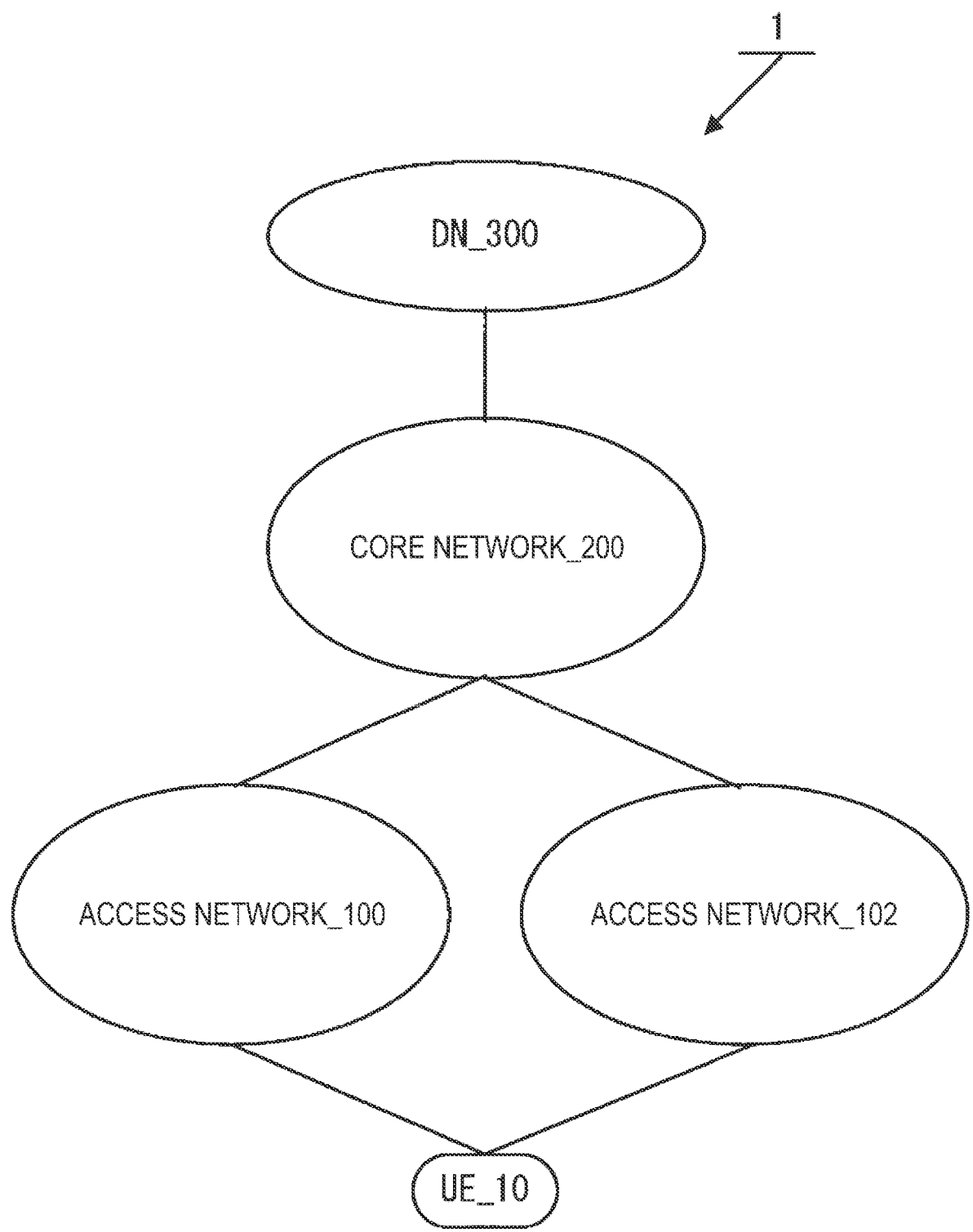
FIG. 1 is a diagram illustrating an overview of a mobile communication system 1.
Figure 2:
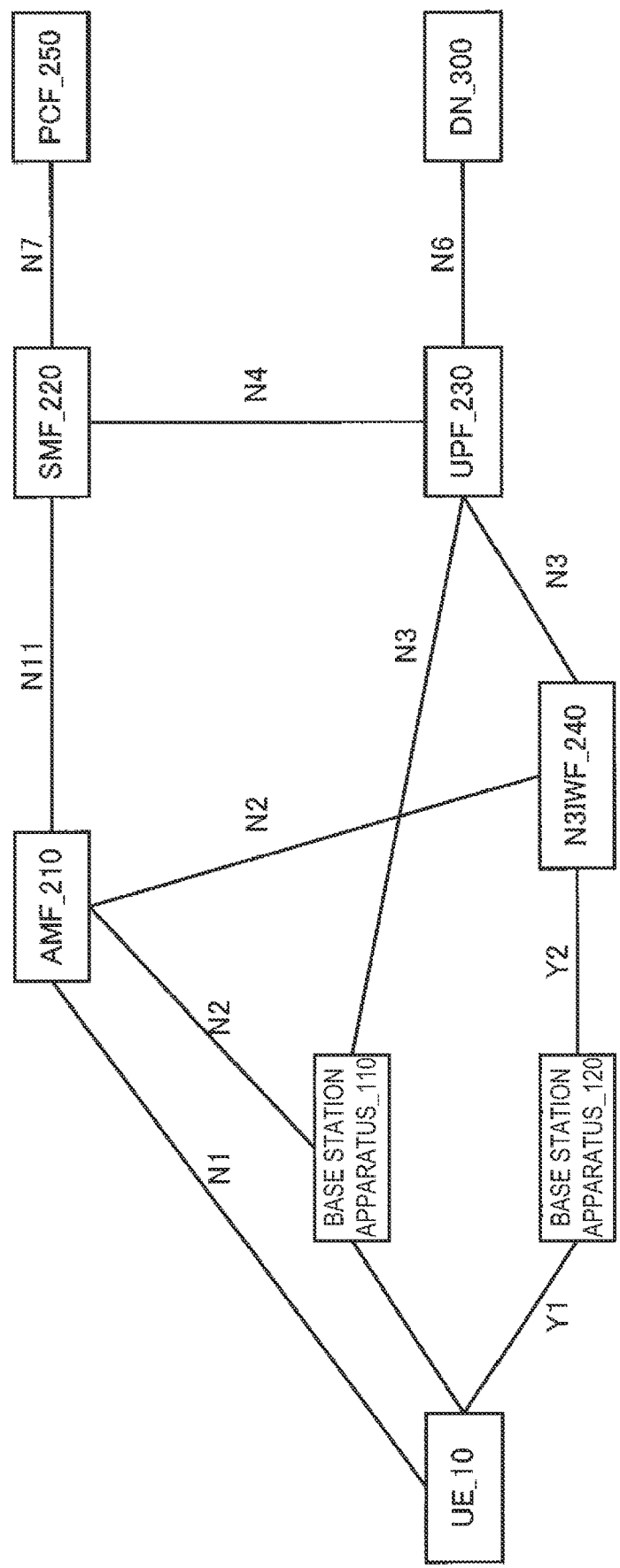
FIG. 2 is a diagram illustrating a detailed configuration of the mobile communication system 1.

First, FIG. 1 is a diagram schematically illustrating a mobile communication system 1, and FIG. 2 is a diagram illustrating a detailed configuration of the mobile communication system 1.

FIG. 1 illustrates that the mobile communication system 1 includes a User Equipment (UE)_10, an access network_100, an access network_102, a core network_200, and a Data Network (DN)_300. Note that, with the symbols omitted, the above-described apparatus and networks may be described as the UE, access networks, core networks, DN, and the like.

FIG. 2 illustrates apparatuses and network functions such as the UE_10, a base station apparatus_110, a base station apparatus_120, an Access and Mobility Management Function (AMF)_210, a Session Management Function (SMF)_220, a User Plane Function (UPF)_230, a Non-3GPP InterWorking Function (N3IWF)_240, a Policy Control Function (PCF)_250, and the DN_300, and interfaces connecting these apparatuses and network functions to one another. Note that, with the symbols omitted, the above-described apparatuses and network functions may be described as the UE, base station apparatus, AMF, SMF, UPF, N3IWF, PCF, DN, and the like.

Note that the 5GS (5G System) that is a 5G system includes a UE, an access network, and a core network, but may further include a DN.

The UE may be an apparatus that can connect to a network service over the 3GPP access (also referred to as the 3GPP access network or 3GPP AN) and/or the non-3GPP access (also referred to as the non-3GPP access network or non-3GPP AN). The UE may be a terminal apparatus which can perform wireless communication such as a mobile phone or a smartphone, and may be a terminal apparatus that can connect to an Evolved Packet System (EPS) corresponding to a 4G system as well as to a 5GS. In addition, the UE may include a Universal Integrated Circuit Card (UICC) and an embedded UICC (eUICC). Note that the UE may be expressed as a user equipment or may be expressed as the terminal apparatus. Note that the UE is an apparatus that can use an Access Traffic Steering, Switching and Splitting (ATSSS) function, in other words, an ATSSS capable UE.

The access network may be referred to as a 5G access network (5G AN). The 5G AN includes an NG Radio Access Network (NG-RAN) and/or a non-3GPP Access Network (non-3GPP an). One or more base station apparatuses are allocated in the NG-RAN. The base station apparatus may be a gNB. The gNB is a node that provides the UE with a New Radio (NR) user plane and control plane and that connects to a 5GC via an NG interface (including an N2 interface or N3 interface). In other words, the gNB is a base station apparatus newly designed for the 5GS, and includes functions different from the functions of a base station apparatus (eNB) used in the EPS. In a case that there are multiple gNBs, the gNBs are connected together by, for example, an Xn interface. Note that the base station apparatus_110 corresponds to the gNB.

The NG-RAN may hereinafter be referred to as the 3GPP access. A wireless LAN access network or non-3GPP AN may be referred to as the non-3GPP access. Nodes allocated in the access network may also be collectively referred to as NG-RAN nodes.

The access network and/or an apparatus included in an apparatus included in the access network may be referred to as an access network apparatus.

Note that the access network_100 corresponds to the 3GPP access, and the access network_102 corresponds to the non-3GPP access.

The base station apparatus_110 is allocated in the access network_100, and the base station apparatus_120 is allocated in the access network_102. Note that the base station apparatus_110 and the base station apparatus_120 may be capable of utilizing an ATSSS function.

The access network_102 may be referred to as an Untrusted Non-3GPP Access or a Trusted Non-3GPP Access. The base station apparatus_120 and the N3IWF illustrated in FIG. 2 are illustrated for a case of an Untrusted Non-3GPP Access. In other words, in a case that the access network_102 is an Untrusted Non-3GPP Access, the base station apparatus_120 and the N3IWF are used. In a case that the access network_102 is a Trusted Non-3GPP Access (also referred to as a Trusted Non-3GPP Access Network, TNAN), then instead of the base station apparatus_120 and the N3IWF, a Trusted Non-3GPP Access Point (also referred to as a TNAP) and a Trusted Non-3GPP Gateway Function (also referred to as a TNGF) are used. The TNAP and the TNGF are allocated in the access network_102 or the core network_200.

The core network corresponds to a 5GC (5G Core Network). In the 5GC, for example, AMFs, UPFs, SMFs, PCFs, and the like are allocated. In this regard, the 5GC may be referred to as a 5G Core Network (5GCN). Note that the AMF, UPF, SMF, and PCF may utilize the ATSSS function.

The N3IWF is allocated in the access network_102 or the core network_200.

The core network and/or an apparatus included in the core network may hereinafter be referred to as a core network apparatus.

The core network may refer to an IP mobile communication network that is operated by a Mobile Communication Network Operator (MNO) and connects an access network and a DN, or may be a core network for a mobile communication network operator operating and managing the mobile communication system 1, or may be a core network for a Mobile Virtual Network Operator (MVNO), a Mobile Virtual Network Enabler (MVNE), or the like.

The DN may be a DN providing a communication service to the UE. Note that the DN may be configured as a packet data service network, or configured for each service. Furthermore, the DN may include a connected communication terminal. Thus, connecting with the DN may be connecting with a communication terminal or a server apparatus allocated in the DN. Furthermore, transmission and/or reception of user data to and/or from the DN may be transmission and/or reception of the user data to and/or from a communication terminal or a server apparatus allocated in the DN.

Hereinafter, at least a portion of the access network, the core network, or the DN, and/or one or more apparatuses included in these networks may be referred to as a network or network apparatus. Specifically, the expression "the network and/or the network apparatus transmits and/or receives a message and/or performs a procedure" signifies that "at least a portion of the access network, the core network, or the DN, and/or one or more apparatuses included in these networks transmits and/or receives a message and/or performs a procedure".

The UE can connect to the access network. The UE can connect to the core network via the access network. Furthermore, the UE can connect to the DN via the access network and the core network. In other words, the UE can transmit and/or receive (communicate) user data to and/or from the DN. In transmission and/or reception of user data, non-IP communication may be used in addition to Internet Protocol (IP) communication.

In this regard, the IP communication is a data communication using IP, and data is transmitted and/or received by using IP packets. The IP packet includes an IP header and a payload portion. The payload portion may include data transmitted and/or received by apparatuses and functions included in the EPS and by apparatuses and functions included in the 5GS.

The non-IP communication refers to a data communication that does not use the IP, and in the non-IP communication, the data is transmitted and/or received in a format different from the structure of the IP packet. For example, the non-IP communication may be the data communication achieved through transmission and/or reception of application data provided with no IP header, or may involve transmitting and/or receiving user data provided with another header such as a MAC header or an Ethernet (trade name) frame header, or the like and transmitted and/or received by the UE.

2. Configuration of Each Apparatus

Now, the configuration of each apparatus (UE, and/or access network apparatus and/or core network apparatus) used in each embodiment will be described with reference to the figures. Note that each apparatus may be configured as physical hardware, may be configured as logical (virtual) hardware configured on general purpose hardware, or may be configured as software. At least some of the functions (which includes a case of all the functions) of each apparatus may be configured as physical hardware, logical hardware, or software.

Note that each of the storage units (storage unit_330, storage unit_440, and storage unit_540) in the apparatuses and functions appearing below includes, for example, a semiconductor memory, a Solid State Drive (SSD), a Hard Disk Drive (HDD), or the like. Each storage unit can store various types of information transmitted and/or received to and/or from apparatuses and functions other than the subject apparatus and function (e.g., UE and/or access network apparatus and/or core network apparatus, and/or PDN, and/or DN), as well as information originally configured prior to shipment. Each storage unit can store identification information, control information, flags, parameters, and the like included in control messages transmitted and/or received in various communication procedures described below. Each of the storage units may store such information for each UE.

2.1. Apparatus Configuration of UE_10

Figure 3:
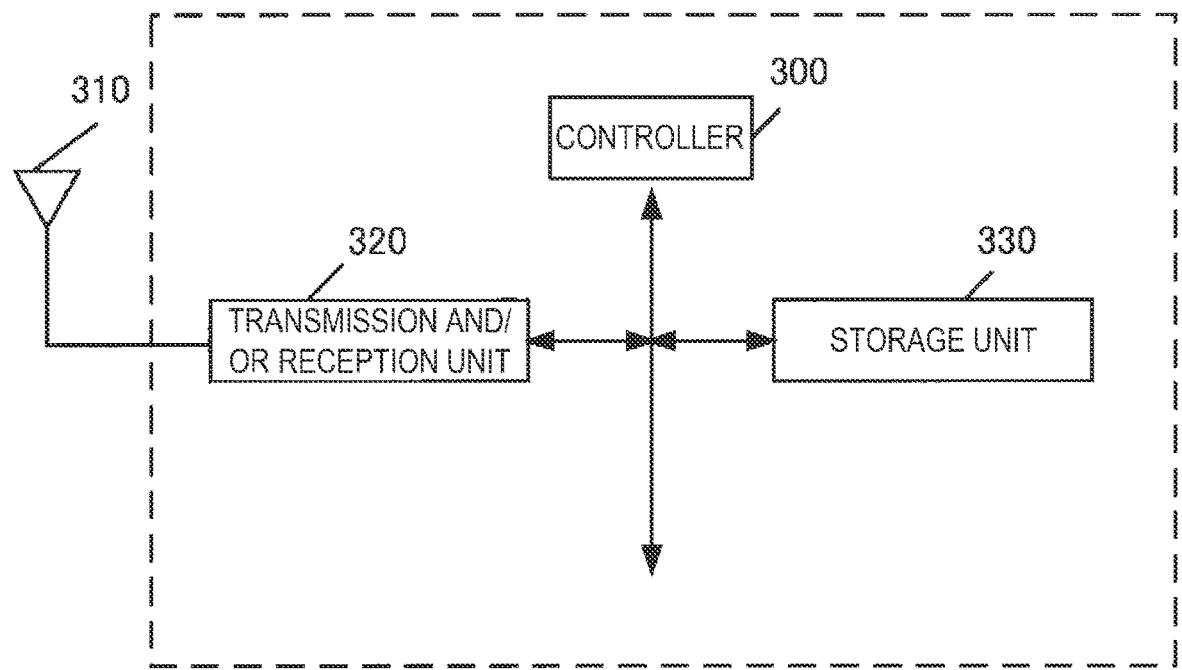
FIG. 3 is a diagram illustrating an apparatus configuration of a UE.

First, an example of an apparatus configuration of a UE used in each embodiment will be described with reference to FIG. 3. The UE includes a controller_300, an antenna_310, a transmission and/or reception unit_320, and a storage unit_330. The controller_300, the transmission and/or reception unit_320, and the storage unit_330 are connected together via a bus. The transmission and/or reception unit_320 is connected to the antenna_310.

The controller_300 is a function unit for controlling the operation and function of the entire UE. Note that the controller_300 may process all functions not included in other function units (the transmission and/or reception unit_320 and the storage unit_330) in the UE. The controller_300 implements various processing operations in the UE by reading out and performing various programs stored in the storage unit_330 as necessary.

The transmission and/or reception unit_320 is a function unit for wirelessly communicating with a base station apparatus or the like in the access network via the antenna_310. In other words, the UE can transmit and/or receive user data and/or control information to and/or from the access network apparatus and/or the core network apparatus and/or the DN by using the transmission and/or reception unit_320.

Specifically, the UE can communicate with the base station apparatus_110, the base station apparatus_120, and the TNAP by using the transmission and/or reception unit_320. In other words, the UE communicates with the base station apparatus_110 in a case of communicating over the 3GPP access. The UE communicates with the base station apparatus_120 or the TNAP in a case of communicating over the non-3GPP access. More specifically, the UE communicates with the base station apparatus_120 in a case of communicating over an Untrusted non-3GPP Access, and the UE communicates with the TNAP in a case of communicating over a Trusted non-3GPP Access. Thus, the UE can change a connection destination depending on the access network utilized.

The UE can communicate with the core network apparatus (AMF, SMF, UPF, or the like) by using the transmission and/or reception unit_320.

The UE can transmit and/or receive a Non-Access-Stratum (NAS) message to and/or from the AMF via an N1 interface (interface between the UE and the AMF). However, the N1 interface is a logical interface, and thus communication between the UE and the AMF is actually performed via the base station apparatus_110, the base station apparatus_120, and the TNAP. Specifically, the UE can communicate with the AMF via the base station apparatus_110 in a case of communicating over the 3GPP access. The UE can communicate with the AMF via the base station apparatus_120 and the N3IWF in a case of communicating over the non-3GPP access (Untrusted non-3GPP Access). The UE can communicate with the AMF via the TNAP and the TNGF. In a case of communicating over the non-3GPP access (Trusted non-3GPP Access). The information exchanged between the UE and the AMF is mostly control information.

The UE can communicate with the SMF by using the N1 interface and an N11 interface (interface between the AMF and the SMF). Specifically, the UE can communicate with the SMF via the AMF. Note that a communication path between the UE and the AMF may follow three types of paths depending on the access (3GPP access, Untrusted Non-3GPP Access, Trusted Non-3GPP Access) as described above. The information exchanged between the UE and the SMF is mostly control information.

The UE can communicate with the UPF by using an N3 interface (interface between the access network and the UPF). Specifically, the UE can communicate with the UPF via the base station apparatus_110 in a case of communicating over the 3GPP access. The UE can communicate with the UPF via the base station apparatus_120 and the N3IWF in a case of communicating over the non-3GPP access (Untrusted non-3GPP Access). The UE can communicate with the UPF via the TNAP and the TNGF in a case of communicating over the non-3GPP access (Trusted non-3GPP Access). A communication path between the UE and the UPF is mainly used to transmit and/or receive user data.

The UE can communicate with the PCF by using the N1 interface, the N11 interface, and an N7 interface (the interface between the SMF and the PCF). Specifically, the UE can communicate with the PCF via the AMF and the SMF. Note that a communication path between the UE and the AMF may follow three types of paths depending on the access (3GPP access, Untrusted Non-3GPP Access, Trusted Non-3GPP Access) as described above. The information exchanged between the UE and the PCF is mostly control information.

The UE can communicate with the DN by using the N3 interface and an N6 interface (interface between the UPF and the DN). Specifically, the UE can communicate with the DN via the base station apparatus_110 and the UPF in a case of communicating over the 3GPP access. The UE can communicate with the DN via the base station apparatus_120, the N3IWF, and the UPF in a case of communicating over the non-3GPP access (Untrusted non-3GPP Access). The UE can communicate with the DN via the TNAP, the TNGF, and the UPF in a case of communicating over the non-3GPP access (Trusted non-3GPP Access). A communication path between the UE and the DN, i.e., a PDU session or an MA PDU session, is mainly used to transmit and/or receive user data.

Note that the above description contains only the communication between the UE and the representative apparatuses/functions presented herein and that the UE can of course communicate with apparatuses/functions other than those described above, i.e., core network apparatuses other than those described above.

The storage unit_330 is a function unit for storing programs, user data, control information, and the like necessary for each operation of the UE.

The UE supports the ATSSS function, and control information received from the core network side is desirably stored in the storage unit_330. The controller_300 may include a function to determine whether to communicate by using the MA PDU session or the SA PDU session in accordance with control information received from the core network side or the control information stored in the storage unit_330. In a case that communication is performed by using the MA PDU session, whether to communicate only over the 3GPP access, only over the non-3GPP access, or over the 3GPP access and the non-3GPP access. In a case that communication is performed by using the SA PDU session, whether to communicate only over the 3GPP access or only over the non-3GPP access can be determined. In accordance with these determinations, the controller_300 controls the transmission and/or reception unit_320 in such a manner as to allow appropriate communication.

The UE may include a function to determine which access uplink traffic is to be routed to according to ATSSS rules received from the SMF in a case of communicating by using the MA PDU session.

The UE may include a function to request the establishment of the MA PDU session based on URSP rules received from the PCF.

2.2. Apparatus Configuration of Base Station Apparatus_110

Figure 4:
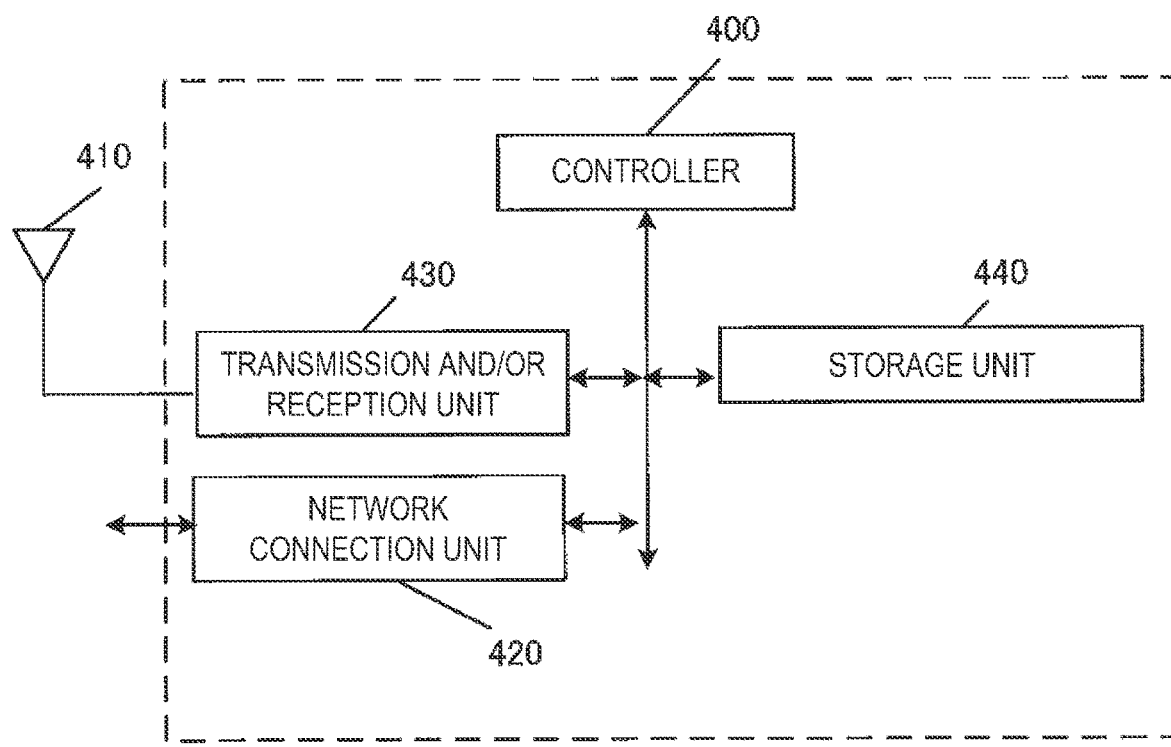
FIG. 4 is a diagram mainly illustrating a configuration of an access network apparatus.

Now, an example of the apparatus configuration of the base station apparatus_110 used in each of the embodiments will be described with reference to FIG. 4. The base station apparatus_110 is a base station apparatus allocated in the 3GPP access. The base station apparatus_110 includes a controller_400, an antenna_410, a network connection unit_420, a transmission and/or reception unit_430, and a storage unit_440. The controller_400, the network connection unit_420, the transmission and/or reception unit_430, and the storage unit_440 are connected together via a bus. The transmission and/or reception unit_430 is connected to the antenna_410. The base station apparatus_110 may be a base station apparatus that supports the ATSSS function.

The controller_400 is a function unit for controlling the operation and function of the entire base station apparatus_110. Note that the controller_400 may process all of the functions that are not included in the functions of the other function units of the base station apparatus_110 (the network connection unit_420, the transmission and/or reception unit_430, and the storage unit_440). The controller_400 implements various processing operations in the base station apparatus_110 by reading out and performing, as necessary, various programs stored in the storage unit 440.

The network connection unit_420 is a function unit through which the base station apparatus_110 communicates with the AMF and/or the UPF. In other words, the base station apparatus_110 can transmit and/or receive control information and/or user data to and from the AMF and/or UPF and the like by using the network connection unit_420.

Specifically, the base station apparatus_110 can communicate with the AMF via the N2 interface (interface between the access network and the AMF) by using the network connection unit_420. The base station apparatus_110 can communicate with the UPF via the N3 interface by using the network connection unit_420.

The transmission and/or reception unit_430 is a function unit for wirelessly communicating with the UE via the antenna_410. In other words, the base station apparatus_110 can transmit and/or receive user data and/or control information to and from the UE by using the transmission and/or reception unit_430 and the antenna_410.

The base station apparatus_110 includes a function to, in a case of receiving, from the UE, user data and/or control information addressed to the core network apparatus, transmit the user data and/or control information to the core network apparatus. The base station apparatus_110 includes a function to, in a case of receiving, from the core network apparatus, user data and/or control information addressed to the UE, transmit the user data and/or control information to the UE.

Note that the above description contains only the communication between the base station apparatus_110 and the representative apparatuses/functions and that the base station apparatus_110 can of course communicate with apparatuses/functions other than those described above, i.e., core network apparatuses other than those described above.

The storage unit_440 is a function unit for storing programs, user data, control information, and the like necessary for each operation of the base station apparatus_110.

2.3. Apparatus Configuration of Base Station Apparatus_120

Now, an example of the apparatus configuration of the base station apparatus_120 used in each of the embodiments will be described with reference to FIG. 4. The base station apparatus_120 is a base station apparatus allocated in the non-3GPP Access (Untrusted non-3GPP Access). The base station apparatus_120 includes the controller_400, the antenna_410, the network connection unit_420, the transmission and/or reception unit_430, and the storage unit_440. The controller_400, the network connection unit_420, the transmission and/or reception unit_430, and the storage unit_440 are connected together via a bus. The transmission and/or reception unit_430 is connected to the antenna_410. The base station apparatus_120 may be a base station apparatus that supports the ATSSS function.

The controller_400 is a function unit for controlling the operation and function of the entire base station apparatus_120. Note that the controller_400 may process all of the functions that are not included in the functions of the other function units of the base station apparatus_120 (the network connection unit_420, the transmission and/or reception unit_430, and the storage unit_440). The controller_400 implements various processing operations in the base station apparatus_120 by reading out and performing, as necessary, various programs stored in the storage unit 440.

The network connection unit_420 is a function unit through which the base station apparatus_120 communicates with the N3IWF and through which the base station apparatus_120 communicates with the AMF and/or the UPF via the N3IWF. In other words, the base station apparatus_120 can transmit and/or receive control information and/or user data to and from the N3IWF by using the network connection unit_420. The base station apparatus_120 can transmit and/or receive control information and/or user data to and from the AMF and/or UPF and the like by using the network connection unit_420.

In other words, the base station apparatus_120 can communicate with the N3IWF via a Y2 interface (interface between the access network and the N3IWF) by using the network connection unit_420. The base station apparatus_120 can communicate with the AMF through the N3IWF via the N2 interface (interface between the N3IWF and the AMF). The base station apparatus_120 can communicate with the UPF through the N3IWF via the N3 interface (interface between the N3IWF and the UPF).

The transmission and/or reception unit_430 is a function unit for wirelessly communicating with the UE via the antenna_410. In other words, the base station apparatus_120 can transmit and/or receive user data and/or control information to and from the UE via a Y1 interface (interface between the access network and the UE) by using the transmission and/or reception unit_430 and the antenna_410.

The base station apparatus_120 includes a function to, in a case of receiving, from the UE, user data and/or control information addressed to the core network apparatus, transmit the user data and/or control information to the core network apparatus. The base station apparatus_120 includes a function to, in a case of receiving, from the core network apparatus, user data and/or control information addressed to the UE, transmit the user data and/or control information to the UE.

Note that the above description contains only the communication between the base station apparatus_120 and the representative apparatuses/functions and that the base station apparatus_120 can of course communicate with apparatuses/functions other than those described above, i.e., core network apparatuses other than those described above.

The storage unit_440 is a function unit for storing programs, user data, control information, and the like necessary for each operation of the base station apparatus_120.

2.4. Apparatus Configuration of TNAP

Now, an example of the apparatus configuration of the TNAP used in each embodiment will be described with reference to FIG. 4. The TNAP is a base station apparatus (also referred to as an access point) allocated in the non-3GPP access (Trusted non-3GPP Access). The TNAP includes the controller_400, the antenna_410, the network connection unit_420, the transmission and/or reception unit_430, and the storage unit_440. The controller_400, the network connection unit_420, the transmission and/or reception unit_430, and the storage unit_440 are connected together via a bus. The transmission and/or reception unit_430 is connected to the antenna_410. The TNAP may be a TNAP that supports the ATSSS function.

The controller_400 is a function unit for controlling the operation and function of the entire TNAP. Note that the controller_400 may process all of the functions that are not included in the functions of the other function units of the TNAP (the network connection unit_420, the transmission and/or reception unit_430, and the storage unit_440). The controller_400 implements various processing operations in the TNAP by reading out and performing, as necessary, various programs stored in the storage unit_440.

The network connection unit_420 is a function unit through which the TNAP communicates with the TNGF and through which the TNAP communicates with the AMF and/or the UPF via the TNGF. In other words, the TNAP can transmit and/or receive control information and/or user data to and from the TNGF by using the network connection unit_420. The TNAP can transmit and/or receive control information and/or user data to and/or from the AMF and/or UPF and the like by using the network connection unit_420.

In other words, the TNAP can communicate with the TNGF via a Ta interface (interface between the TNAP and the TNGF) by using the network connection unit_420. The TNAP can communicate with the AMF via the N2 interface (interface between the TNGF and AMF) via the TNGF. The TNAP can communicate with the UPF via the TNGF via the N3 interface (interface between the TNGF and the UPF).

The transmission and/or reception unit_430 is a function unit for wirelessly communicating with the UE via the antenna_410. In other words, the TNAP can transmit and/or receive user data and/or control information to and from the UE via a Yt interface (interface between the TNAP and the UE) by using the transmission and/or reception unit_430 and the antenna_410.

The TNAP includes a function to, in a case of receiving, from the UE, user data and/or control information addressed to the core network apparatus, transmit the user data and/or control information to the core network apparatus. The TNAP includes a function to, in a case of receiving, from the core network apparatus, user data and/or control information addressed to the UE, transmit the user data and/or control information to the UE.

Note that the above description contains only the communication between the TNAP and the representative apparatuses/functions and that the TNAP can of course communicate with apparatuses/functions other than those described above, i.e., core network apparatuses other than those described above.

The storage unit_440 is a function unit for storing programs, user data, control information, and the like necessary for each operation of the TNAP.

2.5. Apparatus Configuration of N3IWF_240

Figure 5:
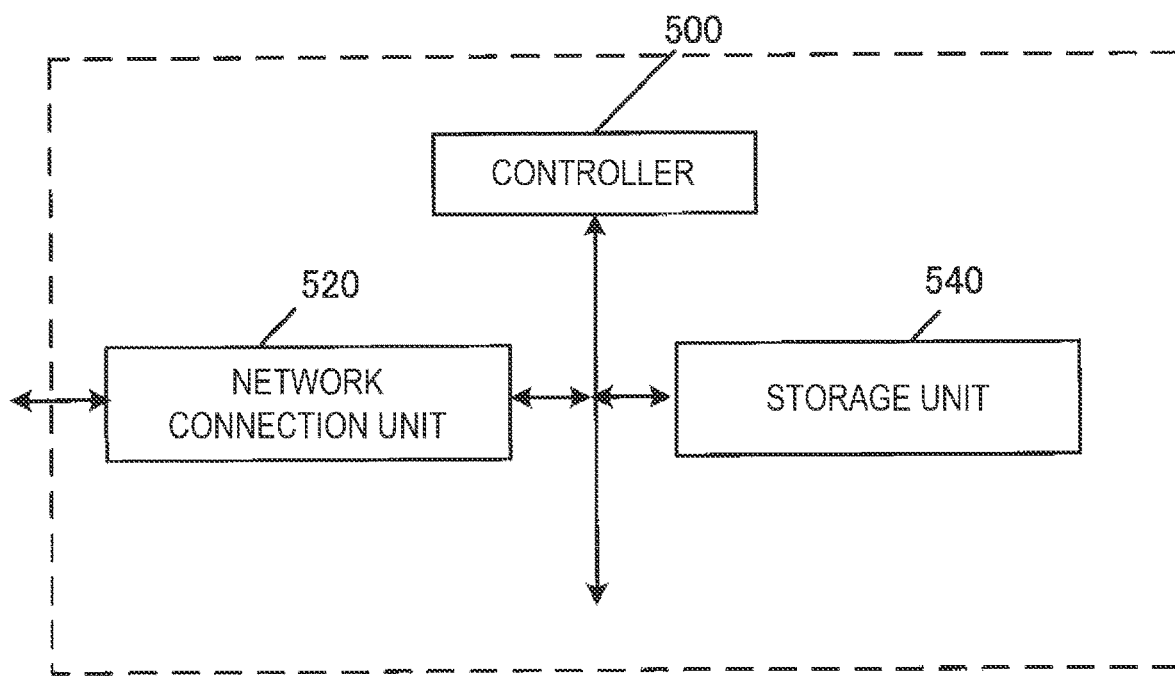
FIG. 5 is a diagram mainly illustrating a configuration of a core network apparatus.

Now, an example of the apparatus/function configuration of the N3IWF used in each embodiment will be described with reference to FIG. 5. The N3IWF is an apparatus and/or function allocated between the non-3GPP access and the 5GC in a case of the connection of the UE to the 5GS over the non-3GPP Access (Untrusted non-3GPP Access), and is specifically allocated in the non-3GPP access (Untrusted non-3GPP Access) or the core network. The N3IWF includes a controller_500, a network connection unit_520, and a storage unit_540. The controller_500, the network connection unit_520, and the storage unit_540 are connected together via a bus. The N3IWF may be an N3IWF that supports the ATSSS function.

The controller_500 is a function unit for controlling the operation and function of the entire N3IWF. Note that the controller_500 may process all of the functions that are not included in the functions of the other function units of the N3IWF (the network connection unit_520 and the storage unit_540). The controller_500 implements various processing operations in the N3IWF by reading out and performing, as necessary, various programs stored in the storage unit_540.

The network connection unit_520 is a function unit through which the N3IWF communicates with the base station apparatus_120 and/or the AMF and/or UPF. In other words, the N3IWF can transmit and/or receive control information and/or user data to and from the base station apparatus_120 by using the network connection unit_520. The N3IWF can transmit and/or receive control information and/or user data to and/or from the AMF and/or UPF and the like by using the network connection unit_520.

In other words, the N3IWF can communicate with the base station apparatus_120 via the Y2 interface by using the network connection unit_520. The N3IWF can communicate with the AMF via the N2 interface. The N3IWF can communicate with the UPF via the N3 interface.

Note that the above description contains only the communication between the N3IWF and the representative apparatuses/functions and that the N3IWF can of course communicate with apparatuses/functions other than those described above, i.e., core network apparatuses other than those described above.

The storage unit_540 is a function unit for storing programs, user data, control information, and the like necessary for each operation of the N3IWF.

Note that the N3IWF includes a function to establish an IPsec tunnel with the UE, a function to terminate the N2 interface for the control plane, a function to terminate the N3 interface for the user plane, a function to relay NAS signaling between the UE and the AMF, a function to process N2 signaling from the SMF for the PDU session or QoS, a function to establish IPsec Security Association (SA) in order to support traffic for the PDU session, a function to relay user plane packets between the UE and the UPF (including a function to encapsulate/decapsulate packets for IPsec and an N3 tunnel), a function to serve as a local mobility anchor in the untrusted non-3GPP access network, a function to select the AMF, and the like. These functions are all controlled by the controller_500.

2.6. Apparatus Configuration of TNGF

Now, an example of the apparatus/function configuration of the TNGF used in each embodiment will be described with reference to FIG. 5. The TNGF is an apparatus and/or function allocated between the non-3GPP access and the 5GC in a case of the connection of the UE to the 5GS over the non-3GPP Access (Trusted non-3GPP Access), and is specifically allocated in the non-3GPP access (Trusted non-3GPP Access) or the core network. The TNGF includes the controller_500, the network connection unit_520, and the storage unit_540. The controller_500, the network connection unit_520, and the storage unit_540 are connected together via a bus. The TNGF may be a TNGF that supports the ATSSS function.

The controller_500 is a function unit for controlling the operation and function of the entire TNGF. Note that the controller_500 may process all of the functions that are not included in the functions of the other function units of the TNGF (the network connection unit_520 and the storage unit_540). The controller_500 implements various processing operations in the TNGF by reading out and performing, as necessary, various programs stored in the storage unit_540.

The network connection unit_520 is a function unit through which the TNGF communicates with the TNAP and/or AMF and/or UPF. In other words, the TNGF can transmit and/or receive control information and/or user data to and from the TNAP by using the network connection unit_520. The TNGF can transmit and/or receive control information and/or user data to and/or from the AMF and/or UPF and the like by using the network connection unit_520.

In other words, the TNGF may use the network connection unit_520 to communicate with the TNAP via the Y2 interface. The TNGF can communicate with the AMF via the N2 interface. The TNGF can communicate with the UPF via the N3 interface.

Note that the above description contains only the communication between the TNGF and the representative apparatuses/functions and that the TNGF can of course communicate with apparatuses/functions other than those described above, i.e., core network apparatuses other than those described above.

The storage unit_540 is a function unit for storing programs, user data, control information, and the like necessary for each operation of the TNGF.

Note that the TNGF includes a function to terminate the N2 interface and the N3 interface, a function to behave as an admitter in a case that the UE registers with the 5GC via the TNAN, a function to select the AMF, a function to transparently relay an NAS message between the UE and the AMF (without processing the message), a function to process the SMF and N2 signaling in order to support the PDU session or QoS, a function to transparently relay PDUs between the UE and the UPF (without processing the PDUs), a function to serve as a local mobility anchor in the TNAN, and the like. These functions are all controlled by the controller_500.

2.7. Apparatus Configuration of AMF_210

Now, an example of the apparatus configuration of the AMF used in each embodiment will be described with reference to FIG. 5. The AMF includes the controller_500, the network connection unit_520, and the storage unit_540. The controller_500, the network connection unit_520, and the storage unit_540 are connected together via a bus. The AMF may be a node that handles the control plane. The AMF may be an AMF that supports the ATSSS function.

The controller_500 is a function unit for controlling the operation and function of the entire AMF. Note that the controller_500 may process all of the functions that are not included in the functions of the other function units of the AMF (the network connection unit_520 and the storage unit_540). The controller_500 implements various processing operations in the AMF by reading out and performing, as necessary, various programs stored in the storage unit_540.

The network connection unit_520 is a function unit through which the AMF connects to the base station apparatus, and/or the SMF, and/or the PCF, and/or the UDM, and/or an SCEF in the 5G AN. In other words, the AMF can transmit and/or receive user data and/or control information to and/or from the base station apparatus, and/or the SMF, and/or the PCF, and/or the UDM, and/or the SCEF in the 5G AN by using the network connection unit_520.

As described in more detail with reference to FIG. 2, by using the network connection unit_520, the AMF in the 5GC can communicate with the base station apparatus via the N2 interface, can communicate with the UDM via an N8 interface (interface between the AMF and the UDM), can communicate with the SMF via the N11 interface, and can communicate with the PCF via an N15 interface (interface between the AMF and the PCF). The AMF can transmit and/or receive the NAS message to and/or from the UE via the N1 interface by using the network connection unit_520. However, the N1 interface is logical, and thus, communication between the UE and the AMF is actually performed via the 5G AN.

The storage unit_540 is a function unit storing programs, user data, control information, and the like necessary for each operation of the AMF.

The AMF include a function to exchange control messages with the RAN by using the N2 interface, a function to exchange NAS messages with the UE by using the N1 interface, a function to cipher the NAS message and to protect the integrity of the NAS message, a Registration management (RM) function, a Connection management (CM) function, a Reachability management function, a Mobility management function for the UE or the like, a function to transfer Session Management (SM) messages between the UE and the SMF, an Access Authentication (Access Authorization) function, Security Anchor Functionality (SEA), a Security Context Management (SCM) function, a function to support the N2 interface for the Non-3GPP Interworking Function (N3IWF), a function to support transmission and/or reception of NAS signals to and/or from the UE via the N3IWF, a function to authenticate the UE connected via the N3IWF, and the like. These functions are all controlled by the controller_500.

In registration management, the RM state is managed for each UE. In terms of the RM state, the UE and the AMF may be synchronized. The RM state includes a deregistered state (RM-DEREGISTERED state) and a registered state (RM-REGISTERED state). In the RM-DEREGISTERED state, the UE is not registered with the network, and thus, the AMF fails to reach the UE because a UE context in the AMF includes no valid location information or routing information for the UE. In the RM-REGISTERED state, the UE is registered with the network, and thus, the UE can receive services that require registration with the network. Note that the RM state may be expressed as a 5GMM state. In this case, the RM-DEREGISTERED state may be expressed as a 5GMM-DEREGISTERED state, or the RM-REGISTERED state may be expressed as a 5GMM-REGISTERED state.

In other words, the 5GMM-REGISTERED state may be a state in which each apparatus has established the 5GMM context or the PDU session context. Note that in a case that each apparatus is in the 5GMM-REGISTERED state, the UE_10 may initiate transmission and/or reception of user data or control messages, or may respond to paging. Note that, in a case that each apparatus is in the 5GMM-REGISTERED state, the UE_10 may further perform the registration procedures other than a registration procedure for initial registration, and/or a service request procedure.

Furthermore, the 5GMM-DEREGISTERED state may be a state in which each apparatus has not established the 5GMM context or in which the location information of the UE_10 is not recognized by the network or in which the network is prevented from reaching the UE_10. Note that in a case that each apparatus is in the 5GMM-DEREGISTERED state, the UE_10 may initiate the registration procedure, or may establish the 5GMM context by performing the registration procedure.

In connection management, the CM state is managed for each UE. In terms of the CM state, the UE and the AMF may be synchronized. The CM state includes a disconnected state (CM-IDLE state) and a connected state (CM-CONNECTED state). In the CM-IDLE state, the UE is in the RM-REGISTERED state but does not have a NAS signaling connection established between the AMF and the UE via the N1 interface. In the CM-IDLE state, the UE does not have an N2 interface connection (N2 connection) and an N3 interface connection (N3 connection). On the other hand, in the CM-CONNECTED state, the UE has the NAS signaling connection established between the AMF and the UE via the N1 interface. In the CM-CONNECTED state, the UE may have N2 interface connection (N2 connection) and/or N3 interface connection (N3 connection).

Furthermore, in connection management, the CM state in the 3GPP access and the CM state in the non-3GPP access may be separately managed. In this case, the CM state in the 3GPP access may include a non-connected state in the 3GPP access (CM-IDLE state over 3GPP access) and a connected state in the 3GPP access (CM-CONNECTED state over 3GPP access). Furthermore, the CM state in the non-3GPP access may include a non-connected state in the non-the 3GPP access (CM-IDLE state over non-3GPP access) and a connected state in the non-the 3GPP access (CM-CONNECTED state over non-3GPP access). Note that the non-connected state may be expressed as the idle mode, and the connection state mode may be expressed as the connection mode.

Note that the CM state may be expressed as the 5GMM mode. In this case, the non-connected state may be expressed as the 5GMM non-connected mode (5GMM-IDLE mode), and the connected state may be expressed as the 5GMM connected mode (5GMM-CONNECTED mode). Furthermore, the non-connected state in the 3GPP access may be expressed as the 5GMM non-connected mode over the 3GPP access (5GMM-IDLE mode over 3GPP access), and the connected state in the 3GPP access may be expressed as the 5GMM connected mode over the 3GPP access (5GMM-CONNECTED mode over 3GPP access). In addition, the non-connected state in the non-3GPP access may be expressed as the 5GMM non-connected mode over the non-3GPP access (5GMM-IDLE mode over non-3GPP access), and the connected state in the non-3GPP access may be expressed as the 5GMM connected mode over the non-3GPP access (5GMM-CONNECTED mode over non-3GPP access). Note that the 5GMM non-connected mode may be expressed as the idle mode, and the 5GMM connected mode may be expressed as the connected mode.

One or more AMFs may be allocated within the core network. The AMF may be an NF that manages one or more Network Slice Instances (NSIs). The AMF may be a Common Control Plane Network Function (CCNF, Common CPNF) shared among multiple NSIs.

2.8. Apparatus Configuration of SMF 220

Now, an example of the apparatus configuration of the SMF used in each embodiment is described with reference to FIG. 5. The SMF includes the controller_500, the network connection unit_520, and the storage unit_540. The controller_500, the network connection unit_520, and the storage unit_540 are connected together via a bus. The SMF may be a node that handles the control plane. The SMF may be an SMF that supports the ATSSS function.

The controller_500 is a function unit for controlling the operation and function of the entire SMF. Note that the controller_500 may process all of the functions that are not included in the functions of the other function units of the SMF (the network connection unit_520 and the storage unit_540). The controller_500 implements various processing operations in the SMF by reading out and performing, as necessary, various programs stored in the storage unit_540.

The network connection unit_520 is a function unit through which the SMF connects to the AMF, and/or UPF, and/or the PCF, and/or UDM. In other words, the SMF can transmit and/or receive user data and/or control information to and/or from the AMF, and/or the UPF, and/or the PCF, and/or the UDM by using the network connection unit_520.

As described in detail with reference to FIG. 2, by using the network connection unit_520, the SMF in the 5GC can communicate with the AMF via the N11 interface, can communicate with the UPF via an N4 interface (interface between the SMF and the UPF), can communicate with the PCF via the N7 interface, and can communicate with the UDM via an N10 interface (interface between the SMF and the UDM).

The storage unit_540 is a function unit for storing programs, user data, control information, and the like necessary for each operation of the SMF.

Note that the SMF includes a Session Management function for establishment, modification, release, and the like of the PDU session, a function for IP address allocation for the UE and management of the IP address, a function for UPF selection and control, a UPF configuration function for routing traffic to an appropriate destination (transmission destination), a function to transmit and/or receive an SM portion of the NAS message, a function to notify arrival of downlink data (Downlink Data Notification), a function to provide AN-specific (AN-by-AN) SM information transmitted to the AN via the N2 interface through the AMF, a function to determine an Session and Service Continuity (SSC) mode for a session management response, a roaming function, and the like. The SMF includes a function to create ATSSS rules and N4 rules from PCC rules received from the PCF. The ATSSS rules are information for controlling the MA PDU session transmitted from the SMF to the UE. The N4 rules are information for controlling the MA PDU session transmitted from the SMF to UPF. The SMF includes a function to manage the PCC rules, the ATSSS rules, and the N4 rules. In association with one another (this is also referred to as mapping). These functions are all controlled by the controller_500.

2.9. Apparatus Configuration of UPF 230

Now, an example of the apparatus configuration of UPF used in each embodiment will be described with reference to FIG. 5. The UPF includes the controller_500, the network connection unit_520, and the storage unit_540. The controller_500, the network connection unit_520, and the storage unit_540 are connected together via a bus. The UPF may be a node that handles the user plane. The UPF may be a UPF that supports the ATSSS function.

The controller_500 is a function unit for controlling the operation and function of the entire UPF. Note that the controller_500 may process all of the functions that are not included in the functions of the other function units of the UPF (the network connection unit_520 and the storage unit_540). The controller_500 implements various processing operations in the UPF by reading out and performing, as necessary, various programs stored in the storage unit_540.

The network connection unit_520 is a function unit through which the UPF connects to the base station apparatus, and/or the SMF, and/or the DN in the 5G AN. In other words, the UPF can transmit and/or receive user data and/or control information to and/or from the base station apparatus, and/or the SMF, and/or the DN in the 5G AN by using the network connection unit_520.

As described in detail with reference to FIG. 2, by using the network connection unit_520, the UPF in the 5GC can communicate with the base station apparatus via the N3 interface, can communicate with the SMF via the N4 interface, and can communicate with the DN via the N6 interface, and can communicate with the other UPF via an N9 interface (interface between the UPFs).

The storage unit_540 is a function unit for storing programs, user data, control information, and the like necessary for each operation of the UPF.

Note that the UPF includes a function to serve as an anchor point for intra-RAT mobility or inter-RAT mobility, a function as an external PDU session point for interconnection with the DN (in other words, a function to serve as a gateway between the DN and the core network to transfer user data), a function to route and transfer packets, an Uplink Classifier (UL CL) function to support routing of multiple traffic flows for one DN, a Branching point function to support a multi-homed PDU session, a Quality of Service (QoS) processing function for the user plane, a verification function for uplink traffic, a function to trigger buffering of downlink packets and Downlink Data Notification, and the like. The UPF also includes a function to determine, based on the N4 rules received from the SMF, which access the downlink traffic is routed to in a case that the MA PDU session has been established. These functions are all controlled by the controller_500.

The UPF may be a gateway for IP communication and/or non-IP communication. The UPF may include a function to transfer IP communication or a function to perform conversion between non-IP communication and IP communication. Furthermore, the multiple gateways allocated may be gateways connecting the core network with a single DN. Note that the UPF may have connectivity with another NF or may be connected to each apparatus via another NF.

Note that the user plane refers to user data transmitted and/or received between the UE and the network. The user plane may be transmitted and/or received by using the PDU session. Furthermore, for 5GS, the user plane may be transmitted and/or received over the interface between the UE and the NG RAN and/or the N3 interface and/or the N9 interface and/or the N6 interface. The user plane may hereinafter be expressed as the U-Plane.

Furthermore, the control plane is a control message transmitted and/or received to perform communication control and the like of the UE. The control plane may be transmitted and/or received by using the Non-Access-Stratum (NAS) signaling connection between the UE and the AMF. Furthermore, in the 5GS, the control plane may be transmitted and/or received by using the interface between the UE and the NG RAN and the N2 interface. Hereinafter, the control plane may be expressed as the control plane, or may be expressed as the C-Plane.

Furthermore, the User Plane (U-Plane or UP) may be a communication path for transmitting and/or receiving user data, or may include multiple bearers. Moreover, the Control Plane (C-Plane or CP) may be a communication path for transmitting and/or receiving control messages, or may include multiple bearers.

2.10. Apparatus Configuration of PCF 250

Now, an example of the apparatus configuration of the PCF used in each embodiment will be described with reference to FIG. 5. The PCF includes the controller_500, the network connection unit_520, and the storage unit_540. The controller_500, the network connection unit_520, and the storage unit_540 are connected together via a bus. The PCF may be a PCF that supports the ATSSS function.

The controller_500 is a function unit for controlling the operation and function of the entire PCF. Note that the controller_500 may process all of the functions that are not included in the functions of the other function units of the PCF (the network connection unit_520 and the storage unit_540). The controller_500 implements various processing operations in the PCF by reading out and performing, as necessary, various programs stored in the storage unit_540.

The network connection unit_520 is a function unit through which the PCF connects to the SMF and/or an Application Function (AF). In other words, the PCF can transmit and/or receive control information to and/or from the SMF and/or the AF by using the network connection unit_520.

The PCF may communicate with the SMF via the N7 interface by using the network connection unit_520. The PCF may communicate with the Application Function (AF) via the N5 interface (interface between the PCF and the AF) by using the network connection unit_520.

The storage unit_540 is a function unit for storing programs, user data, control information, and the like necessary for each operation of the UPF.

Note that the PCF includes a function to support a unified policy framework, a function to provide policy rules for a control plane function to force the policy framework, a function to access subscription information, and the like. The PCF includes a function to generate a policy for the MA PDU session (also referred to as PCC rules), a policy for the SA PDU session, and URSP rules. The policies and rules are transmitted to the SMF, at least some of the policies and rules may be transmitted to the UE or transmitted to the UPF. These functions are all controlled by the controller_500.

3. Highly Professional Terminology and Identification Information Used in Each Embodiment Now, highly professional terminology and identification information used in each embodiment will be described in advance.

3.1. Description of Highly Professional Terminology Used in Each Embodiment

First, highly professional terminology used in each embodiment will be described.

The network refers to at least a portion of the access network, the core network, or the DN. One or more apparatuses included in at least a portion of the access network, the core network, or the DN may be referred to as a network or a network apparatus. Specifically, the expression "the network transmits and/or receives a message and/or performs processing" may signify that "an apparatus in the network (network apparatus and/or control apparatus) transmits and/or receives a message and/or performs processing". In contrast, the expression "an apparatus in the network transmits and/or receives a message and/or performs processing" may signify that "the network transmits and/or receives a message and/or performs processing".

A Session Management (SM) message (also referred to as a Non-Access-Stratum (NAS) SM message) may be a NAS message used in a procedure for SM, or may be a control message transmitted and/or received between the UE and the SMF via the AMF. Furthermore, the SM message may include a PDU session establishment request message, a PDU session establishment accept message, a PDU session completion message, a PDU session reject message, a PDU session modification request message, a PDU session modification accept message, a PDU session modification response message, and the like. The procedure for SM may include a PDU session establishment procedure.

A 5G System (5GS) service may be a connection service provided using the core network. Furthermore, the 5GS service may be a service different from the EPS service, or a service similar to the EPS service.

A non 5GS service may be a service other than the 5GS service, and may include an EPS service and/or a non EPS service.

A Data Network Name (DNN) may be identification information for identifying the core network and/or an external network such as the DN. Furthermore, the DNN can also be used as information for selecting a gateway such as the UPF to which the core network is connected. The DNN may correspond to an Access Point Name (APN) in the EPS.

The PDU session can be defined as association between the UE and the DN providing a PDU connectivity service, but in particular may be connectivity established between the UE and the external gateway or DN. By establishing a PDU session in the 5GS via the access network and the core network, the UE can transmit and/or receive user data to and/or from the DN by using the PDU session. In this regard, the external gateway may be a UPF, an SCEF, or the like. By using the PDU session, the UE can transmit and/or receive user data to and/or from an apparatus such as an application server which is allocated in the DN. A PDU connectivity service is a service that provides PDU exchange between the UE and the DN. The PDU session includes only user plane resources in one access network (3GPP Access Network or non-3GPP Access Network) and may be referred to as the SA PDU session. In other words, the SA PDU session may be a PDU session that is different from the MA PDU session and that does not include both user plane resources in the 3GPP access network and user plane resources in the non-3GPP access network.

Note that each apparatus (the UE, the access network apparatus, and/or the core network apparatus) may correlate one or more pieces of identification information to the PDU session for management. Note that these pieces of identification information may include one or more of a DNN, TFT, or PDU session type, application identification information, NSI identification information, access network identification information, and an SSC mode, or may further include other information. Furthermore, in a case that multiple PDU sessions are established, respective pieces of identification information associated with the PDU sessions may be the same contents or may be different contents.

The MA PDU session may be a PDU session providing a PDU connectivity service allowing one 3GPP access network and one non-3GPP access network to be simultaneously used. The MA PDU session may be a PDU session that provides a PDU connectivity service that enables one 3GPP access network or one non-3GPP access network to be used at one point in time. In other words, the MA PDU session may include only user plane resources in the 3GPP access network, or only user plane resources in the non-3GPP access network, or may include both user plane resources in the 3GPP access network and user plane resources in the non-3GPP access network.

In other words, the UE communicating with the DN by using the MA PDU session may be the UE communicating with the DN by using only user plane resources in the 3GPP access network, or the UE communicating with the DN by using only user plane resources in the non-3GPP access network, or the UE communicating with the DN by using user plane resources in the 3GPP access network and user plane resources in the non-3GPP access network. With such a technique, by using the MA PDU session, the UE can transmit and/or receive user data to and/or from an apparatus such as an application server which is allocated in the DN.

Note that each apparatus (the UE, the access network apparatus, and/or the core network apparatus) may correlate one or more pieces of identification information to the MA PDU session for management. Note that these pieces of identification information may include one or more of the DNN, TFT, or PDU session type, application identification information, NSI identification information, access network identification information, and the SSC mode, or may further include other information. Furthermore, in a case that multiple MA PDU sessions are established, pieces of identification information associated with the respective MA PDU sessions may include the same contents or different contents.

The PDU (Protocol Data Unit or Packet Data Unit) session type indicates the type of the PDU session, and includes IPv4, IPv6, Ethernet (trade name), and Unstructured. Specification of IPv4 indicates that data is transmitted and/or received by using IPv4. Specification of IPv6 indicates that data is transmitted and/or received by using IPv6. Specification of Ethernet (trade name) indicates transmission and/or reception of Ethernet (trade name) frames. Ethernet (trade name) may indicate that communication using IP is not performed. Specification of Unstructured indicates that data is transmitted and/or received to and/or from the application server or the like in the DN by using a Point-to-Point (P2P) tunneling technology. As the P2P Tunneling technology, for example, a UDP/IP encapsulation technology may be used. Note that the PDU session type may include IP in addition to the above-described types. IP can be specified in a case that the UE can use both IPv4 and IPv6. Note that IP may also be expressed as IPv4v6.

A Network Slice (NS) is a logical network that provides specific network capability and network performance. The UE and/or network can support network slices (NW slices; NS) in the 5GS.

A Network Slice Instance (NSI) includes an instance (entity) of the network function (NF) and a set of required resources, and forms an allocated network slice. Here, the NF is a processing function in the network and is employed or defined in the 3GPP. The NSI is an entity of one or more NSs configured in the core network. The NSI may include a virtual Network Function (NF) generated using a Network Slice Template (NST). In this regard, the NST is associated with a resource request for providing a required communication service or capability, and is a logical expression of one or more NFs. Specifically, the NSI may be an aggregation including multiple NFs in the core network. The NSI may be a logical network configured to classify the user data delivered through a service or the like. The NS may include one or more NFs. The NF included in the NS may be an apparatus shared by another NS or otherwise. The UE and/or apparatus in the network can be assigned to one or more NSs based on subscription information such as NSSAI and/or S-NSSAI and/or UE usage type and/or one or more NSI IDs and/or based on APNs. Note that the UE usage type is a parameter value included in the subscription information of the UE and used for identifying the NSI. The UE usage type may be stored in an HSS. The AMF may select the SMF and UPF based on the UE usage type.

Single Network Slice Selection Assistance Information (S-NSSAI) is information for identifying the NS. The S-NSSAI may include only SST (Slice/Service type), or include both SST and Slice Differentiator (SD). In this regard, the SST is information indicating the operation of the NS expected in terms of function and service. The SD may be information that interpolates the SST in a case that one NSI is selected from multiple NSIs indicated by the SST. The S-NSSAI may be information specific to each PLMN or may be standard information common between PLMNs. The network may store one or more pieces of S-NSSAI in the subscription information of the UE as default S-NSSAI. Note that in a case that the S-NSSAI is default S-NSSAI, the network may provide an NS related to the UE in a case that the UE does not transmit valid S-NSSAI to the network in a registration request message.

The Network Slice Selection Assistance Information (NS-SAI) is a group of S-NSSAI. Each piece of S-NSSAI included in the NSSAI is information that assists the access network or the core network in selecting the NSI. The UE may store the NSSAI allowed by the network for each PLMN. The NSSAI may be information used to select the AMF.

The Session and Service Continuity (SSC) mode indicates a mode of Session and Service Continuity supported by the system and/or each apparatus in the 5G system (5GS). To be more specific, the SSC mode may be a mode indicating the type of session and service continuity supported by the PDU session established between the UE and the UPF. Note that the SSC mode may be a mode indicating the type of session and service continuity configured for each PDU session. Furthermore, the SSC mode may include three modes of SSC mode 1, SSC mode 2, and SSC mode 3. Note that the SSC mode associated with the PDU session need not be changed while the PDU session is alive.

SSC mode 1 is a mode in which the network maintains a connectivity service to provide to the UE. Note that in a case that the PDU session type associated with the PDU session is IPv4 or IPv6, the IP address may be maintained for session and service continuity.

Furthermore, SSC mode 1 may be a mode of session and service continuity in which the same UPF is continuously maintained regardless of access technology used by the UE to connect to the network. To be more specific, SSC mode 1 may be a mode in which even in a case that the mobility of the UE occurs, the session and service continuity is achieved with no change in the UPF used as a PDU session anchor for the established PDU session.

SSC mode 2 is a mode in which the network releases the connectivity service provided to the UE and the corresponding PDU session. Note that in SSC mode 2, in a case that the PDU session type associated with the PDU session is IPv4, IPv6, or IPv4v6, the IP address assigned to the UE may be released in a case that the anchor for the PDU session is changed.

Furthermore, SSC mode 2 may be a mode of session and service continuity in which the same UPF is continuously maintained only in a serving area of the UPF. To be more specific, SSC mode 2 may be a mode in which as long as the UE is in the serving area of the UPF, the session and service continuity is achieved with no change in the UPF used by the established PDU session. SSC mode 2 may be a mode in which in a case that the mobility of the UE occurs such that the UE leaves the serving area of the UPF, the session and service continuity is achieved by changing the UPF used by the established PDU session.

In this case, the serving area of the UPF may be an area in which one UPF can provide a session and service continuity function, or a subset of the access network such as an RAT or a cell used in a case that the UE connects to a network. Furthermore, the subset of the access network may be a network including one or multiple RATs and/or cells.

Note that a change in anchor point of the PDU session in SSC mode 2 (hereinafter also referred to as a PDU session anchor) may be achieved by each apparatus performing an anchor point change procedure for the PDU session in SSC mode 2. Note that the anchor or anchor point may be expressed as the endpoint node.

SSC mode 3 is a mode in which a change in the user plane is apparent to the UE with the network ensuring that the connectivity is not lost. Note that in SSC mode 3, in order to achieve better connectivity, a PDU session may be established through a new PDU session anchor point before the established PDU session is disconnected. Furthermore, in SSC mode 3, in a case that the PDU session type associated with the PDU session is IPv4, IPv6, or IPv4v6, the IP address assigned to the UE need not be maintained in a case that the anchor for the PDU session is changed.

Moreover, SSC mode 3 may be a mode of session and service continuity that permits, before disconnection of the PDU session and/or the communication path established between the UE and the UPF, a new PDU session and/or communication path through a new UPF to be established for the same DN. Furthermore, SSC mode 3 may be a mode of session and service continuity that permits the UE to be multi-homed. Furthermore, SSC mode 3 may be a mode that permits the session and service continuity using multiple PDU sessions and/or the UPFs associated with the PDU sessions. In other words, in SSC mode 3, each apparatus may achieve the session and service continuity by using the multiple PDU sessions, or may achieve the session and service continuity by using the multiple UPFs.

In this regard, in a case that each apparatus establishes a new PDU session and/or communication path, a new UPF may be selected by the network, or a new UPF may be an optimal UPF for a place at which the UE connects to the network. Furthermore, in a case that multiple PDU sessions and/or UPFs used by the PDU sessions are effective, the UE may correlate the application and/or flow communication to a new established PDU session, immediately or based on completion of communication.

Note that a change in the anchor point of the PDU session in SSC mode 3 may be achieved by each apparatus performing an anchor point change procedure for the PDU session in SSC mode 3.

A default SSC mode is an SSC mode used by the UE and/or network in a case that no specific SSC mode is determined. Specifically, the default SSC mode may be an SSC mode used by the UE in a case that no SSC mode is requested by the application, and/or in a case that the UE includes no policy for determining the SSC mode for the application. The default SSC mode may be an SSC mode used by the network in a case that no SSC mode requested by the UE.

Note that the default SSC mode may be configured for each DN, for each PDN, for each UE, and/or each subscriber, based on the subscriber information and/or the operator policy and/or the policy of the UE. Furthermore, the default SSC mode may be information indicating SSC mode 1, SSC mode 2, or SSC mode 3.

IP address preservation is a technology for allowing the same IP address to be continuously used. In a case that IP address preservation is supported, the UE can continue to use the same IP address for communication of user data even in a case that the UE moves out of the TA. In other words, in a case that IP address preservation is supported, each apparatus may be able to continue using the same IP address for communication of user data even in a case that the anchor point of the PDU session is changed.

The steering function may be a function by which a UE that can use ATSSS steers, switches, or splits the traffic of the MA PDU session over the 3GPP access and the non-3GPP access. In this regard, the steering function may include a Multi-Path Transmission Control Protocol (MPTCP) function and an Access Traffic Steering, Switching, Splitting (ATSSS)-Low-Layer (LL) function.

The MPTCP function is a steering function for the layers above the IP layer and is applied to TCP traffic. The traffic to which the MPTCP function is applied may be referred to as an MPTCP flow. The MPTCP function of the UE can communicate with an MPTCP proxy function of the UPF by using the user plane of the 3GPP access and/or the non-3GPP access. In response to a request for the MA PDU session and provision of the MPTCP capability, the MPTCP function of the UE may be enabled, and in response to agreement to enable the MPTCP function, the UPF may enable the MPTCP Proxy function of the UPS. The network assigns one IP address/prefix for the MA PDU session and two IP addresses/prefixes (also referred to as link-specific multipath addresses). One of the link-specific multipath addresses is used to establish a subflow over the 3GPP access, and the other is used to establish a subflow over the non-3GPP access. The link-specific multicast address is used only in the MPTCP function of the UE. Routing fails to be achieved via N6. The network can transmit MPTCP proxy information (which may include the IP address, port number, and type of the MPTCP proxy) to the UE. In this regard, the type may be Type 1 (transport converter). The network may indicate to the UE a list of applications to which the MPTCP function is to be applied.

The ATSSS-LL function is a steering function for the layers below the IP layer, and is applied to all types of traffic (TCP traffic, User Data Protocol (UDP) traffic, Ethernet traffic, and the like). The traffic to which the ATSSS-LL function is applied may be referred to as a Non-MPTCP flow. In the UPF, a steering function that is the same as or similar to the ATSSS-LL function may be supported. The ATSSS-LL function of the UE determines the steering, switching, or splitting of the uplink traffic based on the ATSSS rules and the local conditions. In response to a request for the MA PDU session and provision of the ATSSS-LL capability, the ATSSS-LL function of the UE may be enabled, and in response to provision of the ATSSS-LL capability by the UE, the ATSSS-LL function of the UPF may be enabled.

The ATSSS rules are a list of one or more ATSSS rules. The ATSSS rule may include Rule Precedence and/or a Traffic Descriptor and/or an Access Selection Descriptor. In this regard, the Rule Precedence in the ATSSS rule defines the order of the ATSSS rules evaluated in the UE. In a case of receiving the ATSSS rules, i.e., receiving one or more ATSSS rules, the UE may reference the Rule Precedence of each ATSSS rule, and evaluate the ATSSS rules in order of decreasing priority.

The Traffic Descriptor in the ATSSS rule indicates when to apply the ATSSS rule. The Traffic Descriptor in the ATSSS rule may include an Application descriptor and/or an IP descriptor and/or a non-IP descriptor. The Application descriptors may indicate information for identifying applications that generate traffic. The IP descriptors may indicate information for identifying destinations of IP traffic. The non-IP descriptors may indicate information for identifying the destinations of non-IP traffic (e.g., ethernet traffic or unstructured traffic).

The Access Selection Descriptor in the ATSSS rule may include a steering mode and/or a steering function. The steering mode may be information indicating whether to distribute the traffic of a service data flow (also referred to as an SDF) to the 3GPP access or the non-3GPP access. The steering mode may include four modes of Active-Standby, Smallest Delay, Load-Balancing, and Priority-based.

Active-Standby may be a mode in which an active access and a standby access are configured, and in which in a case that the active access is available, the service data flow (SDF) is steered to the access, and in which in a case that the active access becomes unavailable, the SDF is switched to the standby access. Active-Standby may be a mode in which only the active access is configured, and in which in a case that the standby access is not configured and that the active access is available, the service data flow (SDF) is steered to the active access, and in which even in a case that the active access becomes unavailable, the SDF fails to be switched to the standby access.

Smallest Delay may be a mode in which the service data flow (SDF) is steered to an access with the minimum Round-Trip Time (RTT). In a case that this mode is configured, the UE and UPF may perform measurement to determine the RTT for communication over the 3GPP access and the RTT for communication over the non-3GPP access.

Load-Balancing may be a mode in which the service data flow (SDF) is separated into flows for both accesses. In a case that Load-Balancing is specified, Load-Balancing may include information indicating the percentages of the service data flow (SDF) transmitted over the 3GPP access and over non-3GPP access.

Priority-based may be a mode in which all of the traffic of the service data flow (SDF) is steered to a high priority access until the access is determined to be congested. Priority-based may be a mode in which in a case that the access is determined to be congested, the traffic of the SDF is transmitted to a low priority access as well as to the high priority access. Furthermore, Priority-based may be a mode in which in a case that the high priority access is unavailable, all of the traffic of the SDF is transmitted to the low priority access.

The steering function may indicate which of the MPTCP function or the ATSSS-LL function is to be used to steer the traffic of the service data flow (also referred to as the SDF). This information may be used in a case that the UE supports both MPTCP and ATSSS-LL functions.

The UE Route Selection Policy (URSP) rules may include one or more UE Route Selection Policy Rule (URSP). Each URSP rule may include Rule Precedence and/or a traffic descriptor and/or a List of Route Selection Descriptors. In this regard, Rule Precedence in the URSP rule indicates the order of the URSP rules forced in the UE. In a case of receiving the URSP rules, i.e., receiving one or more URSP rules, the UE may reference the Rule Precedence of each URSP rule, and apply the URSP rules in order of decreasing priority.

The Traffic descriptor in the URSP rule indicates when to apply the URSP rule. The Traffic descriptor in the URSP rule includes Application descriptors, and/or IP descriptors, and/or Domain descriptors, and/or Non-IP descriptors, and/or a Data Network Name (DNN), and/or Connection Capabilities. The Application Descriptors may include an OS ID and an OS application ID. The IP descriptors indicate information for identifying the destination of IP traffic, and may include, for example, an IP address, an IPv6 network prefix, a port number, a protocol number, and the like. The Domain descriptors may indicate the Fully Qualified Domain Name (FQDN) of the transmission destination. The non-IP descriptors may indicate information for identifying the destinations of non-IP traffic (e.g., ethernet traffic or unstructured traffic). The DNN may be information related to the DNN provided by the application. The Connection Capabilities may indicate information provided by the application of the UE in a case that the UE requests connection to the network by using a certain capability.

The List of Route Selection Descriptors in the URSP rule may include one or more Root Selection Descriptors. Each Route Selection Descriptor may include Route Selection Descriptor Precedence and/or a Route selection component. The Route Selection Descriptor Precedence indicates the order in which the Route Selection Descriptors are applied. In a case of receiving the Route Selection Descriptors, i.e., receiving one or more Route Selection Descriptors, the UE may reference the Rule Precedence of each Route Selection Descriptor, and apply the Route Selection Descriptors in order of decreasing priority. The Route Selection Descriptor includes an SSC Mode Selection, and/or a Network Slice Selection, and/or a DNN Selection, and/or a PDU Session Type Selection, and/or a Non-Seamless Offload indication, and/or an Access type preference. The SSC Mode Selection may indicate that the traffic of the application is routed via a PDU session in a specified SSC mode. The Network Slice Selection may indicate that the traffic of the application is routed by using a PDU session that supports one or more S-NSSAIs indicated. The DNN Selection may indicate that the traffic of the application is routed by using a PDU session that supports one or more DNNs indicated. Note that in a case that the DNN is used in the Traffic descriptor, the Route Selection Descriptor need not include the DNN Selection. The PDU session type selection may indicate that the traffic of the application is routed by using a PDU session that supports the indicated PDU session type. The Non-Seamless Offload indication may indicate that the traffic of the application is offloaded to the non-3GPP access. The Access Type preference may indicate the access type of the access with which the PDU session is established in a case that the UE needs to establish the PDU session. In this regard, the access type may be 3GPP or non-3GPP or Multi Access. The multi-access may indicate that the PDU session is to be established as an MA PDU session using both 3GPP access and non-3GPP access.

3.2. Description of Identification Information Used in Each Embodiment

Now, the identification information in each embodiment will be described.

First, first identification information is DNN. The first identification information may be information indicating the DNN requested by the UE. Note that in a case that the UE requests the establishment of the MA PDU session, the first identification information may or may not be included in the PDU session establishment request message and/or the NAS message.

Second identification information is information indicating whether the UE supports the ATSSS function. The information indicating whether the UE supports the ATSSS function may be expressed as the ATSSS capability. The second identification information may be information indicating whether the UE supports the MPTCP function, corresponding to one function included in the ATSSS function, and/or information indicating whether the UE supports the ATSSS-LL function, corresponding to another function included in the ATSSS function. The information indicating whether to support the MPTCP function may be expressed as the MPTCP capability, and the information indicating whether to support the ATSSS-LL function may be expressed as the ATSSS-LL capability. In a case that the UE supports only the MPTCP function, the UE can include the MPTCP capability in the second identification information. In a case that the UE supports only the ATSSS-LL function, the UE can include the ATSSS-LL capability in the second identification information. In a case that the UE supports the MPTCP function and the ATSSS-LL function, the UE can include the MPTCP capability and the ATSSS-LL capability in the second identification information. Note that in a case that the UE requests the establishment of the MA PDU session, the second identification information is preferably included in the PDU session establishment request message and/or the NAS message, but need not be included in the PDU session establishment request message and/or the NAS message.

Third identification information is a PDU session ID. The third identification information may be information indicating the PDU session ID requested by the UE (information for identifying the PDU session). Specifically, in a case that the UE requests the establishment of the MA PDU session, the third identification information may be a PDU session ID for identifying the MA PDU session. Note that in a case that the UE requests the establishment of the MA PDU session, the third identification information is preferably included in the PDU session establishment request message and/or the NAS message.

Fourth identification information is information indicating a PDU session type. The fourth identification information may be information indicating the PDU session type requested by the UE. The fourth identification information may be any of IPv4, IPv6, IPv4v6, Unstructured, and Ethernet (trade name). In a case that the UE requests the establishment of the MA PDU session, the fourth identification information may be a PDU session type for the MA PDU session. Note that in a case that the UE requests the establishment of the MA PDU session, the fourth identification information may or may not be included in the PDU session establishment request message and/or the NAS message.

Fifth identification information is the SSC mode. The fifth identification information may be information indicating the SSC mode requested by the UE. The fifth identification information may be any of SSC mode 1, SSC mode 2, and SSC mode 3. In a case that the UE requests the establishment of the MA PDU session, the fifth identification information may be the SSC mode for the MA PDU session. Note that in a case that the UE requests the establishment of the MA PDU session, the fifth identification information may or may not be included in the PDU session establishment request message and/or the NAS message.

Sixth identification information is S-NSSAI. The sixth identification information may be information indicating the S-NSSAI requested by the UE. In a case that the UE requests the establishment of the MA PDU session, the sixth identification information may be the S-NSSAI allowed for both accesses (3GPP access and non-3GPP access). Specifically, the sixth identification information may be one or more pieces of S-NSSAI included in Allowed NSSAI (NSSAI allowed by the network) included in a Registration Accept message received from the AMF in a Registration procedure performed by the UE to register with the 5GS. Note that in a case that the UE requests the establishment of the MA PDU session, the sixth identification information may or may not be included in the PDU session establishment request message and/or the NAS message.

Seventh identification information is a Request type. In this regard, the seventh identification information may indicate any of an Initial request, or an Existing PDU Session, or an Emergency Request, or an Existing Emergency PDU Session. The Initial request may be specified in a case that the establishment of a new PDU session is requested. The Existing PDU Session may be specified in a case that the existing PDU session is switched between the 3GPP access and the non-3GPP access or that the existing PDN connection in the EPC is handed over to a 5G PDU session. The Emergency Request may be specified in a case that the establishment of the PDU session is requested for an Emergency service. The Existing Emergency PDU Session may be specified in a case that the existing PDU session for the Emergency service is switched between the 3GPP access and the non-3GPP access or that the existing PDN connection for the Emergency service in the EPC is handed over to a 5G PDU session. Note that in a case that the UE requests the establishment of the MA PDU session, the seventh identification information may or may not be included in the PDU session establishment request message and/or the NAS message.

Eighth identification information is information indicating the UE requests the establishment of the MA PDU session. The information indicating that the UE requests the establishment of the MA PDU session may be expressed as the MA PDU Request indication. Note that in a case that the UE requests the establishment of the MA PDU session, the eighth identification information is preferably included in the PDU session establishment request and/or the NAS message but need not be included in the PDU session establishment request and/or the NAS message.

Ninth identification information may be information having contents corresponding to a combination of contents of two or more types of identification information included in the first to eighth identification information described above. Note that in a case that the UE requests the establishment of the MA PDU session, the ninth identification information may or may not be included in the PDU session establishment request message and/or the NAS message.

11th identification information is information indicating the DNN. The 11th identification information may be information indicating the DNN determined by the network. Note that in a case that the network allows the SA PDU session or the MA PDU session to be established, the 11th identification information may or may not be included in an ATSSS container Information Element (IE), and/or the PDU session establishment accept message, and/or the NAS message.

The 11th identification information may be information determined by the network based on the first to ninth identification information, and/or network capability information, and/or the operator policy, and/or the state of the network, and/or the user subscription information, and/or the like. The 11th identification information may be identical to the first identification information.

12th identification information may be information indicating whether the network supports the ATSSS function or not. The information indicating whether the network supports the ATSSS function may be expressed as the ATSSS capability. The 12th identification information may be information indicating whether the network supports the MPTCP function, corresponding to one function included in the ATSSS function, and/or information indicating whether network supports the ATSSS-LL function, corresponding to another function included in the ATSSS function. The information indicating whether to support the MPTCP function may be expressed as the MPTCP capability, and the information indicating whether to support the ATSSS-LL function may be expressed as the ATSSS-LL capability. In a case that the network supports only the MPTCP function, the MPTCP capability can be included in the 12th identification information. In a case that the network supports only the ATSSS-LL function, the ATSSS-LL capability can be included in the 12th identification information. In a case that the network supports the MPTCP function and the ATSSS-LL function, the MPTCP capability and the ATSSS-LL capability can be included in the 12th identification information. Note that in a case that the network allows the MA PDU session to be established, the 12th identification information is preferably included in the PDU session establishment accept message and/or the NAS message but need not be included in the PDU session establishment accept message and/or the NAS message. Even in a case that the network does not allow the MA PDU session to be established, in a case that the network allows the SA PDU session to be established, the 12th identification information is preferably included in the ATSSS container Information Element (IE), and/or the PDU session establishment accept message, and/or the NAS message but need not be included in the ATSSS container Information Element (IE), and/or the PDU session establishment accept message, and/or the NAS message.

The 12th identification information may be information determined by the network based on the first to ninth identification information, and/or network capability information, and/or the operator policy, and/or the state of the network, and/or the user subscription information, and/or the like.

13th identification information is information indicating the PDU session ID. The 13th identification information may be information indicating the PDU session ID determined by the network (information for identifying the PDU session). Specifically, the 13th identification information may be the PDU session ID for the SA PDU session or the PDU session ID for the MA PDU session. More specifically, in a case that the network allows the MA PDU session to be established, the 13th identification information may be the PDU session ID for identifying the MA PDU session. In a case that the network allows the SA PDU session to be established, the 13th identification information may be the PDU session ID for identifying the SA PDU session. Note that in a case that the network allows the SA PDU session or the MA PDU session to be established, the 13th identification information is preferably included in the ATSSS container IE. and/or the PDU session establishment accept message, and/or the NAS message.

Furthermore, the 13th identification information may be information determined by the network based on the first to ninth identification information, and/or network capability information, and/or the operator policy, and/or the state of the network, and/or the user subscription information, and/or the like. The 13th identification information may be identical to the third identification information.

Additionally, 14th identification information is the PDU session type. The 14th identification information may be information indicating the PDU session type determined by the network. The 14th identification information may be any of IPv4, IPv6, IPv4v6, Unstructured, and Ethernet (trade name). The 14th identification information may be information indicating the PDU session type corresponding to the PDU session to be established. In a case that the network allows the SA PDU session to be established, the 14th identification information may be the PDU session type for the SA PDU session. In a case that the network allows the MA PDU session to be established, the 14th identification information may be the PDU session type for the MA PDU session. Note that in a case that the network allows the SA PDU session or the MA PDU session to be established, the 14th identification information is preferably included in the ATSSS container IE, and/or the PDU session establishment accept message, and/or the NAS message.

Furthermore, the 14th identification information may be information determined by the network based on the first to ninth identification information, and/or network capability information, and/or the operator policy, and/or the state of the network, and/or the user subscription information, and/or the like. The 14th identification information may be identical to the fourth identification information.

15th identification information is the SSC mode. The 15th identification information may be information indicating the SSC mode determined by the network. The 15th identification information may be any of SSC mode 1, SSC mode 2, and SSC mode 3. The 15th identification information may be information indicating the SSC mode corresponding to the PDU session to be established. In a case that the network allows the SA PDU session to be established, the 15th identification information may be the SSC mode for the SA PDU session. In a case that the network allows the MA PDU session to be established, the 15th identification information may be the SSC mode for the MA PDU session. Note that in a case that the network allows the SA PDU session or the MA PDU session to be established, the 15th identification information is preferably included in the ATSSS container IE, and/or the PDU session establishment accept message, and/or the NAS message.

Furthermore, the 15th identification information may be information determined by the network based on the first to ninth identification information, and/or network capability information, and/or the operator policy, and/or the state of the network, and/or the user subscription information, and/or the like. The 15th identification information may be identical to the fifth identification information.

16th identification information is the S-NSSAI. The 16th identification information may be information indicating the S-NSSAI determined by the network. The 16th identification information may be information indicating the S-NSSAI corresponding to the PDU session to be established. In a case that the network allows the MA PDU session to be established, the 16th identification information may be the S-NSSAI allowed for both accesses (3GPP access and non-3GPP access). In a case that the network allows the SA PDU session to be established, the 16th identification information may be the S-NSSAI allowed for one access (3GPP access or non-3GPP access). Specifically, the 16th identification information may be one or more pieces of S-NSSAI included in Allowed NSSAI (NSSAI allowed by the network) included in the Registration Accept message received from the AMF in the Registration procedure performed by the UE to register with the 5GS. Note that in a case that the network allows the SA PDU session or the MA PDU session to be established, the 16th identification information may or may not be included in the ATSSS container IE, and/or the PDU session establishment accept message, and/or the NAS message.

Furthermore, the 16th identification information may be information determined by the network based on the first to ninth identification information, and/or network capability information, and/or the operator policy, and/or the state of the network, and/or the user subscription information, and/or the like. The 16th identification information may be identical to the sixth identification information.

7th identification information is information indicating the cause of the disallowance of a part of the request from the UE. The 17th identification information may be expressed as the 5GSM cause value.

For example, the 17th identification information may be information indicating the cause of the disallowance of establishment of the MA PDU session. The 17th identification information may be information indicating why no user plane resources are allowed to establish both access (3GPP access and non-3GPP access) configuring the MA PDU session. The 17th identification information may be information indicating the cause of the disallowance of establishment of the user plane resources for one access (3GPP access or non-3GPP access) constituting the MA PDU session. The 17th identification information may be the cause of the allowance of establishment of the SA PDU session for one of the accesses constituting the MA PDU session (3GPP access or non-3GPP access) in spite of the disallowance of establishment of the user plane resources for both accesses (3GPP access and non-3GPP access). Note that the 17th identification information may or may not be included in the ATSSS container IE, and/or the PDU session establishment accept message, and/or the NAS message.

The contents of the 17th identification information may include, for example, operator determined barring, insufficient resources, a missing or unknown DNN, an unknown PDU session type, a user authentication or authorization failed, a request rejected or unspecified, the service option not supported, a requested service option not subscribed, Procedure Transaction Identities (PTI) already in use, a network failure, out of a Local Area Data Network (LADN) service area, the PDU session type IPv4 only allowed, the PDU session type IPv4 only allowed (the PDU session type IPv6 only allowed), the PDU session does not exist, insufficient resources for a specific slice and DNN, not supported SSC mode, insufficient resources for a specific slice, a missing or unknown DNN in a slice, the maximum data rate per UE for user-plane integrity protection is too low, a protocol error, and the like.

18th identification information is information indicating the value of a backoff timer. The 18th identification information may be information indicating the period of time when, after completion of a certain procedure, re-performance of the procedure or new performance of a different procedure is prohibited. Specifically, after completing a certain procedure, the UE having received the 18th identification information fails to perform the procedure again unless the period indicated by the 18th identification information elapses. Note that the 18th identification information may or may not be included in the ATSSS container IE, and/or the PDU session establishment accept message, and/or the NAS message.

19th identification information is information indicating the access type. The 19th identification information may be information indicating, in a case that the network allows the MA PDU session to be established (the network allows the user plane resources for both accesses to be established), the access corresponding to the user plane resources allowed to be established. In this regard, the access corresponding to the allowed user plane resources may be the 3GPP access and/or the non-3GPP access.

The 19th identification information may be information indicating, in a case that the network allows the MA PDU session to be established (only the user plane resources for one access are allowed to be established (establishment of the user plane resources for the other access are rejected)), the access corresponding to the user plane resources allowed to be established, or the access corresponding to the user plane resources rejected from being established. The access corresponding to the user plane resources allowed to be established may be the 3GPP access or the non-3GPP access, or the access corresponding to the user plane resources rejected from being established may be the 3GPP access or the non-3GPP access.

The 19th identification information may be, in a case that the network rejects the MA PDU session from being established but that the SA PDU session for one access is allowed to be established, information indicating the access corresponding to the SA PDU session allowed to be established, or information indicating the access corresponding to the SA PDU session rejected from being established. The access corresponding to the SA PDU session allowed to be established may be the 3GPP access or the non-3GPP access, and the access corresponding to the SA PDU session rejected from being established may be the 3GPP access or the non-3GPP access.

The 19th identification information may be information determined by the network based on the first to ninth identification information, and/or network capability information, and/or the operator policy, and/or the state of the network, and/or the user subscription information, and/or the like. Note that the 19th identification information may or may not be included in the ATSSS container IE, and/or the PDU session establishment accept message, and/or the NAS message.

20th identification information includes ATSSS rules. The 20th identification information may be information determined by the network based on the first to ninth identification information, and/or network capability information, and/or the operator policy, and/or the state of the network, and/or the user subscription information, and/or the like. Note that in a case that the network allows the MA PDU session to be established, the 20th identification information is preferably included in the ATSSS container IE, and/or the PDU session establishment accept message, and/or the NAS message.

21st identification information is information indicating whether the network allows the MA PDU session to be established. The 21st identification information may be information determined by the network based on the first to ninth identification information, and/or network capability information, and/or the operator policy, and/or the state of the network, and/or the user subscription information, and/or the like. Note that the 21st identification information may or may not be included in the ATSSS container IE, and/or the PDU session establishment accept message, and/or the NAS message.

The 22nd identification information is information indicating whether the network allows the SA PDU session to be established. The 22nd identification information may be information determined by the network based on the first to ninth identification information, and/or network capability information, and/or the operator policy, and/or the state of the network, and/or the user subscription information, and/or the like. Note that the 22nd identification information may or may not be included in the ATSSS container IE, and/or the PDU session establishment accept message, and/or the NAS message.

23rd identification information may be information having contents corresponding to a combination of contents of two or more types of identification information included in the 11th to 22nd identification information. Note that the 23rd identification information may or may not be included in the ATSSS container IE, and/or the PDU session establishment accept message, and/or the NAS message.

31st identification information is information indicating whether the network rejects the MA PDU session from being established. The 31st identification information may be information determined by the network based on the first to ninth identification information, and/or network capability information, and/or the operator policy, and/or the state of the network, and/or the user subscription information, and/or the like. Note that the 31st identification information may or may not be included in the PDU session establishment reject message and/or the NAS message.

32nd identification information is information indicating whether the network rejects the SA PDU session from being established. The 32nd identification information may be information determined by the network based on the first to ninth identification information, and/or network capability information, and/or the operator policy, and/or the state of the network, and/or the user subscription information, and/or the like. Note that the 32nd identification information may or may not be included in the PDU session establishment reject message and/or the NAS message.

33rd identification information is the PDU session ID. The 33rd identification information may be information indicating the PDU session ID determined by the network (information for identifying the PDU session). Specifically, the 33rd identification information may be the PDU session ID included in a case that the network rejects a request from the UE. More specifically, in a case that the network rejects the MA PDU session from being established, the 13th identification information may be the PDU session ID for identifying the MA PDU session. In a case that the network rejects the SA PDU session from being established, the 33rd identification information may be the PDU session ID for identifying the SA PDU session. Note that in a case that the network rejects the SA PDU session or the MA PDU session from being established, the 33rd identification information is preferably included in the PDU session establishment reject message and/or the NAS message.

Furthermore, the 33rd identification information may be information determined by the network based on the first to ninth identification information, and/or network capability information, and/or the operator policy, and/or the state of the network, and/or the user subscription information, and/or the like. The 33rd identification information may be identical to the 13th identification information.

34th identification information is the SSC mode. The 34th identification information may be the SSC mode supported by the network. The 34th identification information may be information indicating whether the network supports each of SSC mode 1, SSC mode 2, and SSC mode 3. Note that the 34th identification information is preferably included in the PDU session establishment reject message and/or the NAS message.

Furthermore, the 34th identification information may be information determined by the network based on the first to ninth identification information, and/or network capability information, and/or the operator policy, and/or the state of the network, and/or the user subscription information, and/or the like. The contents of the 34th identification information may be identical to the contents of the 17th identification information.

35th identification information is information indicating the cause of disallowance of the request from the UE. The 35th identification information may be expressed as the 5GSM cause value.

For example, the 35th identification information may be information indicating the cause of the disallowance of establishment of the MA PDU session. The 35th identification information may be information indicating the cause of the disallowance of establishment of the user plane resources for both access (3GPP access and non-3GPP access) configuring the MA PDU session. The 35th identification information may be information indicating the cause of the disallowance of establishment of the SA PDU session. Note that the 35th identification information may or may not be included in the PDU session establishment reject message and/or the NAS message.

36th identification information is information indicating the value of the backoff timer. The 36th identification information may be information indicating the period of time when, after completion of a certain procedure, re-performance of the procedure or new performance of a different procedure is prohibited. Specifically, after completing a certain procedure, the UE having received the 36th identification information fails to perform the procedure again unless the period indicated by the 36th identification information elapses.

37th identification information may be information having contents corresponding to a combination of contents of two or more types of identification information included in the 31st to 36th identification information described above. Note that the 37th identification information may or may not be included in the PDU session establishment reject message and/or the NAS message.

4. MA PDU Session Establishment Procedure

Now, an overview of the MA PDU session establishment procedure performed to establish the MA PDU session for a certain DN will be described with reference to FIG. 6. Hereinafter, the MA PDU session establishment procedure may be referred to simply as the PDU session establishment procedure, or may be referred to as the present procedure.

The MA PDU session establishment procedure is a procedure for each apparatus to establish the MA PDU session in the 5GS. Note that each of the apparatuses can initiate the MA PDU session establishment procedure at any timing when the registration procedure is completed, leading to a registered state. Specifically, in a case that the UE is registered with the 5GS over the 3GPP access and/or the non-3GPP access, the UE can initiate the MA PDU session establishment procedure.

In a case of successful completion of the MA PDU session establishment procedure, each apparatus may establish the MA PDU session. Specifically, each apparatus may establish user plane resources for both accesses constituting the MA PDU session (3GPP access and non-3GPP access). Each apparatus may establish user plane resources for one access (3GPP access or non-3GPP access) constituting the MA PDU session.

In a case of successful completion of the MA PDU session establishment procedure, each apparatus may fail to establish the MA PDU session, but establish the SA PDU session for one access (3GPP access or non-3GPP access).

In a case of unsuccessful completion (abnormal completion) of the MA PDU session establishment procedure, each apparatus can establish neither the MA PDU session nor the SA PDU session.

The MA PDU session establishment procedure may be a procedure initiated by the UE. By performing multiple MA PDU session establishment procedures, each apparatus may establish multiple MA PDU sessions or may establish one or more SA PDU sessions and one or more MA PDU sessions.

A case will be described below in which in a case that the UE is registered with the 5GS over the 3GPP access and the non-3GPP access, the UE initiates the MA PDU session establishment procedure over the 3GPP access or the non-3GPP access to establish the MA PDU session for a certain DN. The description below assumes that the 3GPP access and non-3GPP access and the 5G Core Network (5GC) are all managed/operated by the same operator, but the description below can be applied to a case where the 3GPP access and non-3GPP access and the 5GC are operated by different operators. The description below assumes a simple case where the UE has established neither the SA PDU session nor the MA PDU session (i.e., the UE includes neither user plane resources over the 3GPP access nor user plane resources over the non-3GPP access), but the description below can be applied to a case where the SA PDU session and/or the MA PDU session has been established.

The UE may determine to initiate the MA PDU session establishment procedure to establish the MA PDU session based on information pre-stored in the UE, and/or information previously received from the access network, and/or information previously received from the core network (including identification information received in the registration procedure, and/or the URSP rules previously received from the PCF, and/or the like), and/or the like.

First, the UE transmits the NAS message including the PDU session establishment request message, to the SMF via the 5G AN and the AMF (S900), (S902), and (S904) to initiate the MA PDU session establishment procedure.

Specifically, the UE transmits the NAS message including the PDU session establishment request message to the AMF via the 5G AN through the N1 interface (S900).

In this regard, the 5G AN includes the 3GPP access (also referred to as the 3GPP access network) and the non-3GPP access (also referred to as the non-3GPP access network). In other words, in a case that the UE transmits the NAS message via the 3GPP access, the UE transmits the NAS message to the AMF via the base station apparatus_110. In a case that the UE transmits the NAS message over the non-3GPP access (untrusted non-3GPP access), the UE transmits the NAS message to the AMF via the base station apparatus_120 and the N3IWF. In a case that the UE transmits the NAS message over the non-3GPP access (Trusted non-3GPP access), the UE transmits the NAS message to the AMF via the TNAP and the TNGF. As described above, the communication path to the AMF varies depending on which access is used by the UE to transmit the NAS message, but the communication path from the AMF to the SMF may be identical.

The UE can include at least one type of identification information included in the first to ninth identification information, in the PDU session establishment request message and/or the NAS message for transmission. However, the UE may include the identification information in a different control message, for example, a control message for any of the layers below the NAS layer (e.g., RRC layer, MAC layer, RLC layer, PDCP layer) for transmission. In this regard, the NAS message may be an uplink NAS transport (UL NAS TRANSPORT) message.

By including at least one type of identification information included in the first to ninth identification information, in the PDU session establishment request message and/or the NAS message for transmission, the UE can notify the network side of the request from the UE.

In this regard, the sixth identification information may be the S-NSSAI allowed for both access (3GPP access and non-3GPP access) by the network in the Registration procedure.

By including, in the PDU session establishment request message and/or the NAS message, the eighth identification information and the seventh identification information indicating an Initial request, the UE may notify the network side that the PDU session establishment request message has been transmitted to establish a new MA PDU session and/or that the ATSSS-LL function and/or the MPTCP function are applied to steer the traffic of the MA PDU session. The UE may include the second identification information in the PDU session establishment request message and/or the NAS message to notify the network side whether the UE supports the ATSSS function and/or whether the UE supports the MPTCP function and/or ATSSS-LL function. By including the third identification information in the PDU session establishment request message and/or the NAS message, the UE may notify the network side of the PDU session ID for the MA PDU session. By including the fourth to sixth identification information in the PDU session establishment request message and/or the NAS message, the UE may notify the network side of the PDU session type, the SSC mode, and the S-NSSAI for the MA PDU session requested by the UE.

In response to receiving the NAS message including the PDU session establishment request message (S900), the AMF can retrieve the PDU session establishment request message from the NAS message, and/or recognize that the UE is making a request and/or the various pieces of identification information included in the PDU session establishment request message and/or the NAS message.

Note that in a case that the UE is registered with both accesses but that the S-NSSAI indicated by the sixth identification information received from the UE is not allowed for both accesses, the AMF may reject establishment of the MA PDU session. The AMF may reject establishment of the MA PDU session in a case that the AMF does not support the ATSSS function.

To reject establishment of the MA PDU session, the AMF may transmit the PDU session establishment reject message and/or NAS message including information indicating that the AMF rejects establishment of the MA PDU session, to the UE in response to the PDU session establishment request message and/or the NAS message. At this time, the AMF need not transmit, to the SMF, the identification information included in the PDU session establishment request message and/or the NAS message.

To reject establishment of the MA PDU session, the AMF may transmit, to the SMF, information indicating that the AMF rejects establishment of the MA PDU session to have the SMF transmit, to the UE, the PDU session establishment reject message and/or NAS message including information indicating that the AMF rejects establishment of the MA PDU session.

To reject establishment of the MA PDU session, each apparatus may stop the progress of the present procedure. To reject establishment of the MA PDU session may be rejected in a case that the MA PDU session establishment procedure is not successfully completed.

Note that the AMF may proceed with the next processing without making the determinations described above.

Then, the AMF selects the SMF as a transfer destination for the various types of identification information included in the PDU session establishment request message and/or the NAS message (S902). Note that the AMF may select the SMF as a transfer destination based on each piece of identification information included in the PDU session establishment request message and/or the NAS message, and/or the subscriber information, and/or the capability information of the network, and/or the operator policy, and/or the state of the network, and/or the user subscription information, and/or the context held by the AMF, and/or the like. The AMF may select the SMF supporting the ATSSS function. The description below assumes that the SMF 220 supporting the MA PDU session is be selected.

The AMF transfers the PDU session establishment request message and/or the NAS message to the selected SMF via the N11 interface (S904). The AMF may transmit, to the SMF, information indicating that the UE is registered with both accesses.

In response to receiving the PDU session establishment request message and/or the NAS message transferred from the AMF, the SMF may recognize that the UE is making a request and/or recognize various types of identification information included in the PDU session establishment request message and/or the NAS message. Then, the SMF may perform third condition fulfillment determination. The third condition fulfillment determination may be intended to determine whether to accept the request from the UE. In the third condition fulfillment determination, the SMF determines whether the third condition fulfillment determination is true or false. In a case that the third condition fulfillment determination is true, the SMF initiates a procedure at (A) in FIG. 6. In a case that the third condition fulfillment determination is false, the SMF initiates a procedure at (B) in FIG. 6.

Note that the third condition fulfillment determination may be performed based on each piece of identification information included in the PDU session establishment request message and/or the NAS message, and/or the subscriber information (subscription information), and/or the capability information of the network, and/or the operator policy, and/or the state of the network, and/or the user subscription information, and/or the context held by the SMF, and/or the like. For example, in a case that the network allows the request from the UE, the third condition fulfillment determination may be determined to be true. In a case that the network does not allow the request from the UE, the third condition fulfillment determination may be false. Furthermore, in a case that the network to which the UE is connected and/or an apparatus in the network supports the function requested by the UE, the third condition fulfillment determination may be determined to be true. In a case that the function requested by the UE is not supported, the third condition fulfillment determination may be determined to be false. Moreover, in a case that the identification information transmitted and/or received is allowed, the third condition fulfillment determination may be determined to be true. In a case that the identification information transmitted and/or received is not allowed, the third condition fulfillment determination may be determined to be false.

In a case that the UE initiates the present procedure to request the establishment of an MA PDU session, the third condition fulfillment determination may be determined to be true in a case that the MA PDU session is allowed to be established (in a case that the user plane resources for both accesses are allowed to be established). In a case that the UE initiates the present procedure to request the establishment of an MA PDU session, the third condition fulfillment determination may be determined to be true in a case that the MA PDU session is allowed to be established (in a case that only the user plane resources for one access are allowed to be established (in a case that establishment of the user plane resources for the other accesses are rejected)). In a case that the UE initiates the present procedure to request the establishment of an MA PDU session, the third condition fulfillment determination may be determined to be true in a case that establishment of the MA PDU session is rejected (establishment of the user plane resources for both accesses are rejected) but that the SA PDU session for one access is allowed to be established. In a case that the UE initiates the present procedure to request the establishment of an MA PDU session, the third condition fulfillment determination may be determined to be false in a case that establishment of the MA PDU session is rejected (establishment of the user plane resources for both accesses are rejected) and that the SA PDU session (for both accesses) is allowed to be established. Note that conditions for determining the third condition fulfillment determination to be true or false may not be limited to the above-described conditions.

Now, steps in a case that the third condition fulfillment determination is true, in other words, each step of the procedure at (A) in FIG. 6 will be described.

First, the SMF may select the PCF. For example, in a case that the seventh identification information indicates the Initial request, i.e., in a case that the present procedure is performed to newly establish a PDU session (SA PDU session or MA PDU session), the SMF may select the appropriate PCF based on information received from the AMF, or the like. For example, the SMF may select a PCF supporting the ATSSS function. The SMF may use a previously selected PCF in a case that the seventh identification information indicates an existing PDU session or an existing emergency PDU session. In other words, the PCF need not be selected, but a different PCF may be selected.

Now, the SMF may transmit, to the PCF, each piece of identification information included in the PDU session establishment request message and/or the NAS message received from the AMF (S905).

Furthermore, in a case that the SMF allows the MA PDU session to be established (in a case that the user plane resources for both accesses are allowed to be established), the SMF may transmit, to the PCF, "information indicating that the MA PDU session is allowed to be established", and/or "information indicating that the user plane resources for both accesses are allowed to be established", and/or "information (access type) indicating the access corresponding to the user plane resources allowed to be established". In this regard, the "information (access type) indicating the access corresponding to the user-plane resources allowed to be established" may be the 3GPP access and the non-3GPP access.

To allow the MA PDU session to be established (to allow the user plane resources for one access to be established (to reject establishment of the user plane resources for the other access)), the SMF may transmit, to the PCF, "information indicating that the MA PDU session is allowed to be established", and/or "information indicating that the user plane resources for one access are allowed to be established", "information indicating that establishment of the user plane resources for the other access are rejected", and/or "information (access type) indicating the access corresponding to the user plane resources allowed to be established", and/or "information (access type) indicating the access corresponding to the user plane resources rejected from being established". In this regard, in a case that the "information (access type) indicating the access corresponding to the user plane resources allowed to be established" is the 3GPP access, the "information (access type) indicating the access corresponding to the user plane resources rejected from being established" may be the non-3GPP access. In a case that the information (access type) indicating the access corresponding to the user plane resources allowed to be established is the non-3GPP access, the "information (access type) indicating the access corresponding to the user plane resources rejected from being established" may be the 3GPP access.

To allow the SA PDU session for one access to be established in spite of rejecting establishment of the MA PDU session (in spite of rejecting establishment of the user plane resources for both accesses), the SMF may transmit, to the PCF, the SMF may transmit, to the PCF, "information indicating that the establishment of MA PDU session is rejected", and/or "information indicating that the user plane resources for the MA PDU session for both access are rejected from being established", and/or "information indicating that the SA PDU session for one access is allowed to be established", and/or "information indicating that the SA PDU session for the other access is rejected from being established", and/or "information (access type) indicating the access corresponding to user plane resources for the MA PDU session rejected from being established", and/or "information (access type) indicating the access corresponding to the SA PDU session allowed to be established", and/or "information (access type) indicating the access corresponding to the SA PDU session rejected from being established". In this regard, the "information (access type) indicating the access corresponding to user plane resources for the MA PDU session rejected from being established may be the 3GPP access and the non-3GPP access. In a case that the "information (access type) indicating the access corresponding to the SA PDU session allowed to be established" is the 3GPP access, the "information (access type) indicating the access corresponding to the SA PDU session rejected from being established" may be the non-3GPP access. In a case that the "information (access type) indicating the access corresponding to the SA PDU session allowed to be established" is the non-3GPP access, the "information (access type) indicating the access corresponding to the SA PDU session rejected from being established" may be the 3GPP access.

Now, in response to receiving various types of identification information transmitted from the SMF, the PCF can recognize that the UE requests the establishment of the MA PDU session and/or recognize contents such as the various types of identification information.

Note that the PCF may further make determination similar to the above-described determination in the SMF based on the information received from the SMF, and/or the operator policy, and/or the subscriber information, and/or the like. In this case, information similar to the information transmitted from the SMF to the PCF may be transmitted from the PCF to the SMF.

In a case that the PCF detects that the above-described determination has been made in the SMF, the PCF need not make (may skip) the determination.

The above-described determination may be made only in the PCF without being made in the SMF. At this time, the information transmitted from the SMF to the PCF may be only the identification information included in the PDU session establishment request message and/or the NAS message received from the AMF. In other words, in a case that the above-described determination is made in the SMF, the information additionally transmitted to the PCF need not be transmitted to the PCF. For the information transmitted from the PCF to the SMF, information similar to the information transmitted from the SMF to the PCF may be transmitted from the PCF to the SMF.

Then, in a case that the MA PDU session is allowed to be established, the PCF can generate PCC rules for the MA PDU session. In a case that instead of the MA PDU session, the SA PDU session is allowed to be established, the PCF may generate a policy for the SA PDU session.

For example, in a case of detecting, based on the information received from the SMF, that the MA PDU session has been allowed to be established (the user plane resources for both accesses have been allowed to be established), the PCF may generate PCC rules for the MA PDU session for the user plane resources allowed to be established. To allow the MA PDU session to be established (to allow the user plane resources for both accesses to be established) based on the information received from the SMF and/or the above-described determination in the PCF, the PCF may generate PCC rules for the MA PDU session for the user plane resources allowed to be established.

In a case of detecting, based on the information received from the SMF, that the MA PDU session has been allowed to be established (only the user plane resources for one access have been allowed to be established (establishment of the user plane resources for the other access have been rejected)), the PCF may generate PCC rules for the MA PDU session for the user plane resources allowed to be established. To allow the MA PDU session to be established (to allow the user plane resources for one access to be established (to reject establishment of the user plane resources for the other access)) based on the information received from the SMF and/or the above-described determination in the PCF, the PCF may generate PCC rules for the MA PDU session for the user plane resources allowed to be established.

In a case of detecting, based on the information received from the SMF, that establishment of the MA PDU session has been rejected (establishment of the user plane resources for both accesses have been rejected) but that the SA PDU session for one access has been allowed to be established, the PCF may generate a policy for the SA PDU session allowed to be established, without generating PCC rules for an MA PDU session. To allow the SA PDU session for one access to be established in spite of rejecting establishment of the MA PDU session (in spite of rejecting establishment of the user plane resources for both access) based on the information received from the SMF and/or the above-described determination in the PCF, the PCF may generate a policy for the SA PDU session allowed to be established, without generating PCC rules for an MA PDU session.

Then, in a case that the PCF has generated PCC rules for the MA PDU session, the PCF may transmit the PCC rules to the SMF. The PCF may transmit, to the SMF, information indicating that the MA PDU session is allowed to be established, or may indicate, by transmitting the PCC rules, that the MA PDU session is allowed to be established.

In a case that the PCF has generated a policy for the SA PDU session, the PCF may transmit the policy to the SMF.

In response to receiving various pieces of information from the PCF, the SMF can recognize the information.

Then, in a case of receiving the PCC rules from the PCF, the SMF generates ATSSS rules (20th identification information) and N4 rules from the PCC rules. In this regard, the ATSSS rules are information for controlling the MA PDU session transmitted from the SMF to the UE, and the N4 rules are information for controlling the MA PDU session transmitted from the SMF to the UPF. The SMF may correlate the PCC rules and the ATSSS rules and N4 rules with one another for management (mapping).

The SMF may determine the SSC mode (15th identification information) to be applied to the MA PDU session and/or the SA PDU session. In a case that the fourth identification information indicates any of IPv4, IPv6, or IPv4v6, the SMF may assign the IP address or the IP prefix for the MA PDU session and/or the SA PDU session. In a case that the fourth identification information indicates unstructured, the SMF may assign the IPv6 address for the MA PDU session and/or the SA PDU session. In a case that the fourth identification information indicates Ethernet (trade name), the SMF may assign neither the MAC address nor IP address for the MA PDU session and/or the SA PDU session.

Then, the SMF selects the UPF at which the MA PDU session or the SA PDU session is to be established, and transmits an N4 session establishment request message to the selected UPF via the N4 interface (S906). In this regard, in a case that the present procedure is performed to establish a new PDU session, the N4 session establishment request message may be used. In a case that the present procedure is performed to modify the existing PDU session, an N4 session modification request message may be used instead of the N4 session establishment request message. In this regard, the SMF may select one or more UPFs based on each piece of identification information acquired based on the reception of the PDU session establishment request message, and/or the subscriber information, and/or the capability information of the network, and/or the operator policy, and/or the state of the network, and/or the user subscription information, and/or the context held by the SMF, and/or the like. Note that in a case that multiple UPFs are selected, the SMF may transmit the N4 session establishment request message to each of the UPFs. In a case that the MA PDU session is allowed to be established, the SMF may select a UPF supporting the ATSSS function. In a case that the SA PDU session is allowed to be established, the SMF may select a UPF supporting the SA PDU session, but may select a UPF supporting the ATSSS function. The description below assumes that UPF 230 is selected.

In a case that the MA PDU session is allowed to be established, the N4 rules may be included in the N4 session establishment request message for transmission.

In response to receiving the N4 session establishment request message from the SMF via the N4 interface (S906), the UPF can recognize the contents of information received from the SMF. The UPF creates a context for the MA PDU session or the SA PDU session. The UPF is configured to operate according to the N4 rules in a case of receiving the N4 rules from the SMF. Specifically, the UPF determines which of the accesses the downlink traffic in the MA PDU session to be established is to be routed. Furthermore, the UPF receives the N4 session establishment request message, and/or based on the creation of the context for the MA PDU session or the SA PDU session, the UPF transmits an N4 session establishment response message to the SMF via the N4 interface (S908).

In response to receiving the N4 session establishment response message from the UPF via the N4 interface as a response message to the N4 session establishment request message (S908), the SMF can recognize the contents of the information received from the UPF. The SMF may perform address assignment of an address to be assigned to the UE based on the reception of the PDU session establishment request message, and/or the selection of the UPF, and/or the reception of the N4 session establishment response message, and/or the like.

Then, the SMF transmits the PDU session establishment accept message including the ATSSS container IE, to the UE via the AMF, based on the reception of the PDU session establishment request message, and/or the selection of the UPF, and/or the reception of the N4 session establishment response message, and/or the completion of address assignment of the address to be assigned to the UE (S910) (S912).

Specifically, the SMF transmits the PDU session establishment accept message to the AMF via the N11 interface (S910), and in response to receiving the PDU session establishment accept message, the AMF transmits the NAS message including the PDU session establishment accept message including the ATSSS container IE, to the UE via the 5G AN through the N1 interface (S912).

In this regard, the 5G AN includes the 3GPP access and the non-3GPP access. In other words, in a case that the AMF transmits the NAS message via the 3GPP access, the AMF transmits the NAS message to the UE via the base station apparatus_110. In a case that the AMF transmits the NAS message over the non-3GPP access (untrusted non-3GPP access), the AMF transmits the NAS message to the UE via the N3IWF and the base station apparatus_120. In a case that the AMF transmits the NAS message over the non-3GPP access (Trusted non-3GPP access), the AMF transmits the NAS message to the UE via the TNGF and the TNAP.

The AMF preferably transmits the NAS message to the UE by using an access identical to the access through which the NAS message has been received from the UE, but the AMF may transmit the NAS message to the UE via a different access.

The PDU session establishment accept message may be a response message to the PDU session establishment request. The PDU session establishment accept message may indicate that the establishment of the PDU session has been accepted. Furthermore, the NAS message may be a downlink NAS transport (DL NAS transport) message.

In this regard, the SMF and/or AMF may transmit the ATSSS container IE and/or the PDU session establishment accept message and/or the NAS message to indicate that at least a portion of the request from the UE via the PDU session establishment request message has been accepted.

The SMF and/or AMF may include at least one type of identification information included in the 11th to 23rd identification information, in the ATSSS container IE, and/or the PDU session establishment accept message, and/or the NAS message for transmission. The SMF and/or AMF may transmit at least one of these types of identification information to notify the UE of the contents of the identification information.

For example, in a case that the MA PDU session is allowed to be established (the user plane resources for both accesses are allowed to be established), the 11th to 16th and 19th to 21st identification information and/or 23rd identification information may be included in the ATSSS container IE, and/or the PDU session establishment accept message, and/or the NAS message. In this regard, the 11th identification information may be identical to the first identification information. The 12th identification information may indicate the MPTCP capability and/or the ATSSS-LL capability in the network. The 13th identification information may be identical to the third identification information. The 14th identification information may be identical to the fourth identification information. The 15th identification information may be identical to the fifth identification information. The 16th identification information may be identical to the sixth identification information. The 19th identification information may indicate the 3GPP access and the non-3GPP access. The 20th identification information may indicate the ATSSS rules. The 21st identification information may indicate that the network has allowed the MA PDU session to be established. The 23rd identification information may indicate contents corresponding to a combination of contents of two or more types of identification information included in the 11th to 21st identification information.

Thus, by including specific identification information included in the 11th to 23rd identification information, in the ATSSS container IE, and/or the PDU session establishment accept message, and/or the NAS message, the UE may be notified that the MA PDU session has been allowed to be established, and/or that the user plane resources for both accesses have been allowed to be established, and/or the access type corresponding to the user plane resources allowed to be established. For example, these may be notified to the UE by including, in the ATSSS container IE, and/or the PDU session establishment accept message, and/or the NAS message, the 21st identification information indicating that the network has allowed the MA PDU session to be established, the 13th identification information (PDU session ID), and the 19th identification information (3GPP access and non-3GPP access).

By including specific identification information included in the 11th to 23rd identification information, in the ATSSS container IE, and/or the PDU session establishment accept message, and/or the NAS message, while not including specific identification information in the ATSSS container IE, and/or the PDU session establishment accept message, and/or the NAS message, the UE may be notified that the MA PDU session has been allowed to be established, and/or that the user plane resources for both accesses have been allowed to be established, and/or the access type corresponding to the user plane resources allowed to be established. For example, these may be notified to the UE by including, in the ATSSS container IE, and/or the PDU session establishment accept message, and/or the NAS message, the 21st identification information indicating that the network has allowed the MA PDU session to be established, the 13th identification information (PDU session ID), while not including the 19th identification information (3GPP access and non-3GPP access) in the ATSSS container IE, and/or the PDU session establishment accept message, and/or the NAS message.

In a case that the MA PDU session is allowed to be established (the user plane resources for one access are allowed to be established (establishment of the user plane resources for the other access are rejected), the 11th to 21st identification information and/or 23rd identification information may be included in the ATSSS container IE, and/or the PDU session establishment accept message, and/or the NAS message. In this regard, the 11th identification information may be identical to the first identification information. The 12th identification information may indicate the MPTCP capability and/or the ATSSS-LL capability in the network. The 13th identification information may be identical to the third identification information. The 14th identification information may be identical to the fourth identification information. The 15th identification information may be identical to the fifth identification information. The 16th identification information may be identical to the sixth identification information. The 17th identification information may indicate the cause of the disallowance of establishment of the user plane resources for one access constituting the MA PDU session (3GPP access or non-3GPP access). The 18th identification information may indicate the backoff timer value. The 19th identification information may indicate the 3GPP access or the non-3GPP access. The 20th identification information may indicate the ATSSS rules. The 21st identification information may indicate that the network has allowed the MA PDU session to be established. The 23rd identification information may indicate contents corresponding to a combination of contents of two or more types of identification information included in the 11th to 21st identification information.

As described above, by including specific identification information included in the 11th to 23rd identification information, in the ATSSS container IE, and/or the PDU session establishment accept message, and/or the NAS message, the UE may be notified that the MA PDU session has been allowed to be established, and/or that the user plane resources for one access have been allowed to be established, and/or that establishment of the user plane resources for the other access have been rejected, and/or the access type corresponding to the user plane resources allowed to be established, and/or the access type corresponding to the user plane resources rejected from being established. For example, these may be notified to the UE by including, in the ATSSS container IE, and/or the PDU session establishment accept message, and/or the NAS message, the 21st identification information indicating that the network has allowed the MA PDU session to be established, the 13th identification information (PDU session ID), and the 19th identification information (3GPP access and non-3GPP access).

For SMF, in a case that establishment of the MA PDU session is rejected (establishment of the user plane resources for both accesses are rejected) but that the SA PDU session for one access is allowed to be established, the 11th to 19th identification information and the 21st and 22nd identification information and/or the 23rd identification information may be included in the ATSSS container IE, and/or the PDU session establishment accept message, and/or the NAS message. In this regard, the 11th identification information may be identical to the first identification information. The 12th identification information may indicate the MPTCP capability and/or the ATSSS-LL capability in the network. The 13th identification information may be identical to the third identification information. The 14th identification information may be identical to the fourth identification information. The 15th identification information may be identical to the fifth identification information. The 16th identification information may be identical to the sixth identification information. The 17th identification information may indicate the cause of the rejection of establishment of the MA PDU session for the user plane resources for both accesses. The 18th identification information may indicate the backoff timer value. The 19th identification information may indicate the 3GPP access or the non-3GPP access. The 21st identification information may indicate that the network has rejected establishment of the MA PDU session. The 22nd identification information may indicate that the network has allowed the SA PDU session to be established. The 23rd identification information may indicate contents corresponding to a combination of two or more types of identification information included in the 11th to 19th and the 21st and 22nd identification information. Thus, by including specific identification information included in the 11th to 23rd identification information, in the ATSSS container IE, and/or the PDU session establishment accept message, and/or the NAS message, the UE may be notified that establishment of the MA PDU session has been rejected, and/or that establishment of the user plane resources for the MA PDU session for both accesses have been rejected, and/or that the SA PDU session for one access has been allowed to be established, and/or that establishment of the SA PDU session for the other access has been rejected, and/or the access type corresponding to the user plane resources for the MA PDU session rejected from being established, and/or the access type corresponding to the SA PDU session allowed to be established, and/or the access type corresponding to the SA PDU session rejected from being established. For example, these may be notified to the UE by including, in the ATSSS container IE, and/or the PDU session establishment accept message, and/or the NAS message, the 21st identification information indicating that the network has rejected establishment of the MA PDU session, the 22nd identification information indicating that the network has allowed the SA PDU session to be established, and the 19th identification information (3GPP access and non-3GPP access).

Note that the SMF and/or the AMF may transmit the above-described identification information to indicate that the network supports each function, or indicate that the request from the UE has been accepted.

Note that the SMF and/or AMF may select and determine which type of identification information is included in the ATSSS container IE, and/or the PDU session establishment accept message, and/or the NAS message based on include each type of identification information received, and/or the subscriber information, and/or the network capability information, and/or operator policy, and/or the state of the network, and/or the user subscription information, and/or the context held by the SMF and/or AMF, and/or the like.

The SMF and/or AMF may include the 17th identification information in the ATSSS container IE, and/or the PDU session establishment accept message, and/or the NAS message and transmit the resultant ATSSS container IE, and/or PDU session establishment accept message, and/or NAS message to indicate the cause of the rejection of a portion of the request from the UE. The UE may receive information indicating that a portion of the request from the UE has been rejected to recognize the cause of the rejection of the portion of the request from the UE.

Then, the UE receives, from the AMF via the N1 interface, the NAS message including the PDU session establishment accept message including the ATSSS container IE (S912). The UE can receive the ATSSS container IE, and/or the PDU session establishment accept message, and/or the NAS message to recognize that the request from the UE via the PDU session establishment request message has been accepted and/or recognize the contents of each type of identification information.

Then, the UE can determine, based on information indicated by the identification information included in the ATSSS container IE, and/or the PDU session establishment accept message, and/or the NAS message, whether the MA PDU session has been allowed to be established (the user plane resources for both accesses have been allowed to be established), or the MA PDU session has been allowed to be established (only the user plane resources for one access have been allowed to be established (establishment of the user plane resources for the other access establishment of)), or establishment of the MA PDU session has been rejected (establishment of the user plane resources for both accesses have been rejected) but the SA PDU session for one access has been allowed to be established.

In a case that the UE determines that the MA PDU session has been allowed to be established (the user plane resources for both accesses have been allowed to be established), the UE applies the ATSSS rules indicated by the 20th identification information and can communicate with the DN via the MA PDU session using the user plane resources for both accesses (3GPP access and/or non-3GPP access).

In a case that the UE determines that the MA PDU session has been allowed to be established (only the user plane resources for one access have been allowed to be established (establishment of the user plane resources for the other access have been rejected), the UE applies the ATSSS rules indicated by the 20th identification information, and based on the 19th identification information, identifies the access corresponding to available user plane resources, and can then communicate with the DN via the MA PDU session using the user plane resources for the access (3GPP access or non-3GPP access).

In a case that the UE determines that the MA PDU session establishment has been rejected (establishment of the user plane resources for both accesses have been rejected) but the SA PDU session for one access has been allowed to be established, the UE identifies, based on the 19th identification information, the access corresponding to the available PDU session, and can then communicate with the DN via the SA PDU session for the access (3GPP access or non-3GPP access).

Figure 6:
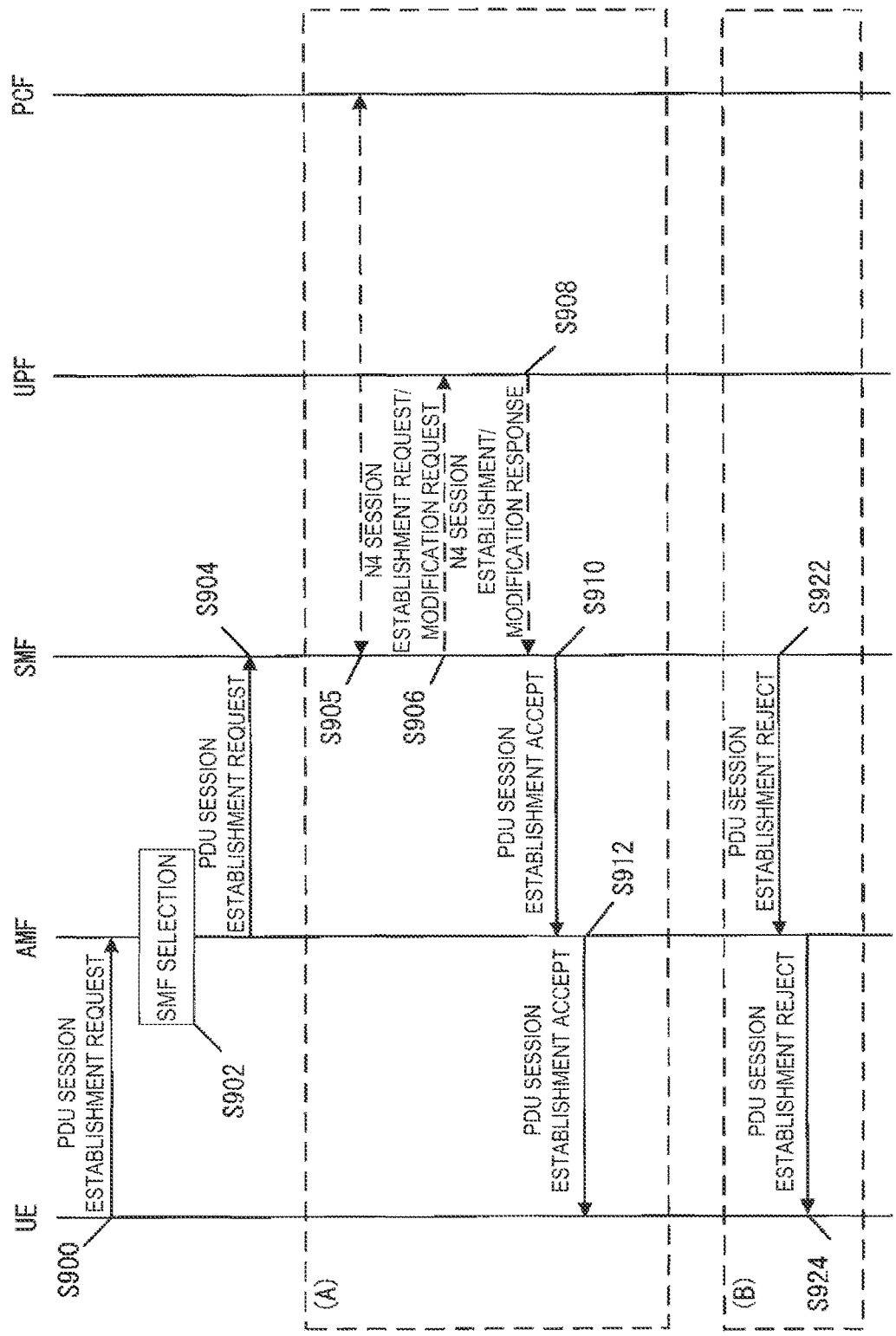
FIG. 6 is a diagram illustrating a PDU session establishment procedure.

As described above, each apparatus may complete the procedure at (A) in FIG. 6 (may successfully complete the MA PDU session establishment procedure) based on the transmission and/or reception of each message in the present procedure (e.g., the transmission and/or reception of the PDU session establishment accept message, and/or the transmission and/or reception of the N4 session establishment request message, and/or the transmission and/or reception of the N4 session establishment response message). The time when the procedure at (A) in FIG. 6 is complete may correspond to the state in which the UE has established the MA PDU session or the SA PDU session. In other words, the time may correspond to the state in which the UE can communicate with the DN by using the MA PDU session or the SA PDU session.

The UE may determine that the MA PDU session has been allowed to be established (the user plane resources for both accesses have been allowed to be established), and even with user plane resources established for both accesses, the UE may again perform the present procedure to further request the establishment of the MA PDU session. For example, the UE may attempt to establish an MA PDU session by immediately performing the present procedure. In a case that the UE performs the present procedure again and transmits the PDU session establishment request message and/or NAS message including the third identification information, the third identification information preferably has a value different from the value of the third identification information included in the PDU session establishment request message and/or the NAS message in the previous procedure and from the value of the 13th identification information included in the PDU session establishment accept message and/or the NAS message in the previous procedure. The 13th identification information included in the PDU session establishment accept message and/or the NAS message in the current procedure is preferably identical to the third identification information included in the PDU session establishment request message and/or NAS message in the current procedure. The 33rd identification information included in the PDU session establishment reject message and/or the NAS message in the current procedure is preferably identical to the third identification information included in the PDU session establishment request message and/or the NAS message in the current procedure. In these cases, additionally, in a case that having two or more MA PDU sessions is not allowed, the UE need not be able to perform the present procedure again.

The UE may determine that the MA PDU session has been allowed to be established (only the user plane resources for one access have been allowed to be established (establishment of the user plane resources for the other access have been rejected), and with only the user plane resources established for one access, the UE may perform the present procedure again to establish the user plane resources rejected from being established this time. For example, in a case that the UE has not received the 18th identification information, by immediately performing the present procedure via the access corresponding to the user plane resources rejected from being established, the UE may attempt to establish the user plane resources for the access. In a case of receiving the 18th identification information, by performing, after a period specified by the 18th identification information, the present procedure via the access corresponding to the user plane resources rejected from being established, the UE may attempt to establish the user plane resources for the access. In a case that the UE performs the present procedure again and transmits the PDU session establishment request message and/or NAS message including at least one type of identification information included in the first to ninth identification information, the first identification information and the third to sixth identification information are preferably respectively identical to the first identification information and third to sixth identification information included in the PDU session establishment request message and/or NAS message included in the previous procedure. This is to explicitly indicate to the network side that this request is supplemental to the MA PDU session established in the previous PDU session establishment procedure. The 11th identification information and 13th to 16th identification information included in the PDU session establishment accept message and/or the NAS message in the current procedure are preferably identical to the first identification information and third to sixth identification information included in the PDU session establishment request message and/or the NAS message in the current procedure. The 33rd identification information included in the PDU session establishment reject message and/or the NAS message in the current procedure is preferably identical to the third identification information included in the PDU session establishment request message and/or the NAS message in the current procedure. In a case that having two or more MA PDU sessions is not allowed, the UE need not be able to perform the present procedure again.

In a case that the SMF and/or PCF determines that the MA PDU session has been allowed to be established in the previous procedure (the user plane resources for one access have been allowed to be established (establishment of the user plane resources for the other access have been rejected), then after the procedure is complete, the SMF and/or PCF may indicate to the network side to initiate the MA PDU session establishment procedure for the UE. For example, the SMF and/or the PCF may indicate to the UE to initiate the MA PDU session establishment procedure by transmitting, to the UE, a control message including the 17th identification information transmitted in the previous procedure and/or information indicating that the cause indicated in the 17th identification information transmitted in the previous procedure has been eliminated. Note that this procedure may be referred to as a Network requested MA PDU Session Establishment Procedure or a Network initiated MA PDU Session Establishment procedure.

The UE may determine that establishment of the MA PDU session has been rejected (establishment of the user plane resources for both accesses have been rejected) but that the SA PDU session for one access has been allowed to be established, and perform the present procedure again even after the establishment of the SA PDU session. For example, in a case that the 18th identification information has not been received, the UE may attempt to establish an MA PDU session by immediately performing the present procedure. In a case that the 18th identification information has been received, the UE may attempt to establish an MA PDU session by performing the present procedure after the period specified in the 18th identification information elapses. In a case that the UE performs the present procedure again and transmits the PDU session establishment request message and/or NAS message including the third identification information, the third identification information preferably has a value different from the value of the third identification information included in the PDU session establishment request message and/or the NAS message in the previous procedure and from the value of the 13th identification information included in the PDU session establishment accept message and/or the NAS message in the previous procedure. The 13th identification information included in the PDU session establishment accept message and/or the NAS message in the current procedure is preferably identical to the third identification information included in the PDU session establishment request message and/or NAS message in the current procedure. The 33rd identification information included in the PDU session establishment reject message and/or the NAS message in the current procedure is preferably identical to the third identification information included in the PDU session establishment request message and/or the NAS message in the current procedure.

In a case that the SMF and/or PCF determines that establishment of the MA PDU session has been rejected in the previous procedure (establishment of the user plane resources for both accesses have been rejected) but that the SA PDU session for one access has been allowed to be established, then after the procedure is complete, the network side may indicate to the UE to initiate the MA PDU session establishment procedure. For example, the SMF and/or the PCF may indicate to the UE to initiate the MA PDU session establishment procedure by transmitting, to the UE, the control message including the 17th identification information transmitted in the previous procedure and/or the information indicating that the cause indicated in the 17th identification information transmitted in the previous procedure has been eliminated. Note that this procedure may be referred to as a Network requested MA PDU Session Establishment Procedure or a Network initiated MA PDU Session Establishment procedure.

Now, each step of the procedure at (B) in FIG. 6 will be described. The procedure at (B) in FIG. 6 may be initiated in a case that establishment of the MA PDU session is rejected (establishment of the user plane resources for both accesses are rejected) and establishment of the SA PDU session (for both accesses) is rejected.

The SMF transmits the PDU session establishment reject message to the UE via the AMF (S922) (S924). Specifically, the SMF transmits the PDU session establishment reject message to the AMF via the N11 interface (S922). In response to receiving the PDU session establishment request message from the SMF (S922), the AMF transmits the NAS message including the PDU session establishment reject message, to the UE by using the N1 interface (S924).

The SMF and/or AMF may include at least one type of identification information included in the 31st to 37th identification information, in the PDU session establishment reject message and/or the NAS message for transmission. The SMF and/or AMF may transmit at least one of these types of identification information to notify the UE of the contents of the identification information.

Note that the PDU session establishment reject message may be the NAS message. The PDU session establishment reject message only needs to be a message indicating that establishment of the MA PDU session and/or the SA PDU session has been rejected.

In this regard, the SMF may transmit the PDU session establishment reject message to indicate that the request from the UE via the PDU session establishment request message has been rejected. Furthermore, the SMF may include information indicating the cause of the rejection, in the PDU session establishment reject message for transmission, or may transmit the cause of the rejection to indicate the cause of the rejection. Moreover, in response to receiving the information indicating the cause of the rejection of the request from the UE, the UE may recognize the cause of the rejection of the request from the UE. Note that the cause of the rejection may be information indicating that the contents indicated by the identification information received by the SMF have not been allowed.

According to reception of the PDU session establishment reject message, the UE can recognize that the request from the UE via the PDU session establishment request message has been rejected and recognize the contents of various types of identification information included in the PDU session establishment reject message.

As described above, each apparatus may complete the procedure at (B) in FIG. 6 (may abnormally complete the MA PDU session establishment procedure) based on the transmission and/or reception of each message in the present procedure (e.g., the transmission and/or reception of the PDU session establishment reject message). The time when the procedure at (B) in FIG. 6 is complete may correspond to the state in which the UE has not established the MA PDU session and the SA PDU session newly requested to be established. In other words, the UE may be prevented from communicating with the DN.

The UE may perform the procedure again in a case of the determination that establishment of the MA PDU session has been rejected (establishment of the user plane resources for both accesses have been rejected) and that establishment of the SA PDU session (for both accesses) has been rejected. For example, in a case that the 36th identification information has not been received, the UE may attempt to establish an MA PDU session by immediately performing the present procedure. In a case that the 36th identification information has been received, the UE may attempt to establish an MA PDU session by performing the present procedure after the period specified in the 36th identification information elapses.

5. Others

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a microcontroller, or a state machine instead. The above-mentioned electric circuit may include a digital circuit, or may include an analog circuit. In a case that with advances in semiconductor technology, a circuit integration technology appears that replaces the present integrated circuits, one or multiple aspects of the present invention are also possible to use a new integrated circuit based on the technology.

Note that the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope not depart from the gist of the present invention. Furthermore, in the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

The invention claimed is:

1. A User Equipment (UE) comprising:
a controller; and
transmission and reception circuitry,
wherein
the transmission and reception circuitry is configured to receive, from an Access and Mobility Management Function (AMF), first information indicating whether a network supports Access Traffic Steering, Switching, Splitting (ATSSS) or not,
the controller is configured to determine whether the ATSSS is supported by the network or not based on the first information,
in a case that the controller determines that the ATSSS is supported by the network based on the first information, the controller is further configured to initiate a Protocol Data Unit (PDU) session establishment procedure,
in a case that the transmission and reception circuitry receives, over a first access which is either one of a third Generation Partnership Project (3GPP) access and a non-3GPP access, a PDU session establishment accept message including an ATSSS container Information Element (IE) in the PDU session establishment procedure, the controller is further configured to consider that a Multi-Access (MA) PDU session has been established and user plane resources of the MA PDU session only on the first access are established, and in a case that the controller determines that the ATSSS is not supported by the network based on the first information, the controller is further configured to forgo initiating the PDU session establishment procedure to establish the MA PDU session.

2. The UE according to claim 1, wherein
the ATSSS container IE includes ATSSS rules.

3. The UE according to claim 1, wherein
the controller is further configured to initiate the PDU session establishment procedure in a case that the UE is registered over both the 3GPP access and the non-3GPP access.

4. A communication control method performed by a User Equipment (UE), the communication control method comprising:

receiving, from an Access and Mobility Management Function (AMF), first information indicating whether a network supports Access Traffic Steering, Switching, Splitting (ATSSS) or not;

determining whether the ATSSS is supported by the network or not based on the first information;

in a case of determining that the ATSSS is supported by the network based on the first information, initiating a Protocol Data Unit (PDU) session establishment procedure;

in a case of receiving, over a first access which is either one of a third Generation Partnership Project (3GPP) access and a non-3GPP access, a PDU session establishment accept message including an ATSSS container Information Element (IE) in the PDU session establishment procedure, considering that a Multi-Access (MA) PDU session has been established and user plane resources of the MA PDU session only on the first access are established, and in a case of determining that the ATSSS is not supported by the network based on the first information, forgoing initiating the PDU session establishment procedure to establish the MA PDU session.

\* \* \* \* \*